(12) United States Patent
Uehara et al.

(10) Patent No.: US 10,013,322 B2
(45) Date of Patent: Jul. 3, 2018

(54) STORAGE APPARATUS AND STORAGE APPARATUS CONTROL METHOD

(71) Applicant: Hitachi, Ltd., Tokyo (JP)

(72) Inventors: Go Uehara, Tokyo (JP); Shigeo Homma, Tokyo (JP); Koji Sonoda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 354 days.

(21) Appl. No.: 14/767,413

(22) PCT Filed: Jun. 3, 2013

(86) PCT No.: PCT/JP2013/065351
§ 371 (c)(1),
(2) Date: Aug. 12, 2015

(87) PCT Pub. No.: WO2014/196000
PCT Pub. Date: Dec. 11, 2014

(65) Prior Publication Data
US 2016/0004615 A1   Jan. 7, 2016

(51) Int. Cl.
G06F 11/20  (2006.01)
G06F 11/07  (2006.01)
G06F 3/06  (2006.01)

(52) U.S. Cl.
CPC ........ *G06F 11/2094* (2013.01); *G06F 3/0619* (2013.01); *G06F 3/0653* (2013.01);
(Continued)

(58) Field of Classification Search
CPC .... G06F 3/0631; G06F 3/0689; G06F 3/0653; G06F 17/30138; G06F 3/0647
See application file for complete search history.

(56) References Cited

U.S. PATENT DOCUMENTS 7,363,540 B2 * 4/2008 Patel ................... G06F 11/1435
707/999.202
7,689,762 B2 * 3/2010 Hobson ................ G11C 16/349
711/103
(Continued)

FOREIGN PATENT DOCUMENTS

JP   2005-284700 A   10/2005
JP   2007-193811 A   8/2007
(Continued)

OTHER PUBLICATIONS

International Search Report of PCT/JP2013/065351.

*Primary Examiner* — Loan L. T. Truong
(74) *Attorney, Agent, or Firm* — Mattingly & Malur, PC

(57) ABSTRACT

A storage controller stores, for each of a plurality of storage devices, a usable capacity, which is a capacity usable by the storage controller in a logical storage area, configures a first RAID group using a first storage device group among the plurality of storage devices, and allocates, on the basis of a request from a host computer, one of a plurality of pages of the logical storage area in the first RAID group to a virtual volume. The storage controller reduces, when receiving first failure information indicating a failure in a first storage device in the first storage device group from the first storage device, a usable capacity of the first storage device on the basis of the first failure information.

18 Claims, 35 Drawing Sheets

(52) U.S. Cl.
CPC ........ *G06F 3/0689* (2013.01); *G06F 11/0727* (2013.01); *G06F 11/0793* (2013.01); *G06F 2201/805* (2013.01)

(56) References Cited

U.S. PATENT DOCUMENTS

| | | | |
|---|---|---|---|
| 8,041,991 B2 | 10/2011 | McKean | |
| 8,275,928 B2* | 9/2012 | Lin | G06F 12/0246 711/103 |
| 8,655,927 B2* | 2/2014 | Sepulveda | G06F 11/1441 707/690 |
| 8,996,790 B1* | 3/2015 | Segal | G06F 12/0246 711/103 |
| 9,021,177 B2* | 4/2015 | Segal | G06F 12/0246 711/103 |
| 9,195,592 B1* | 11/2015 | Weingarten | G06F 12/0246 |
| 9,201,784 B2* | 12/2015 | Nagai | G06F 3/0616 |
| 2002/0156988 A1* | 10/2002 | Toyama | G06F 12/0246 711/203 |
| 2003/0065876 A1* | 4/2003 | Lasser | G06F 12/0246 711/103 |
| 2004/0015771 A1* | 1/2004 | Lasser | G06F 11/1068 714/763 |
| 2004/0080985 A1* | 4/2004 | Chang | G06F 12/0246 365/185.33 |
| 2004/0210706 A1* | 10/2004 | In | G06F 3/0616 711/103 |
| 2005/0018482 A1* | 1/2005 | Cemea | G11C 11/5628 365/185.03 |
| 2005/0232037 A1 | 10/2005 | Asari et al. | |
| 2008/0098158 A1 | 4/2008 | Kitahara | |
| 2010/0002512 A1 | 1/2010 | Cornwell et al. | |
| 2010/0241793 A1* | 9/2010 | Sugimoto | G06F 11/0793 711/103 |

FOREIGN PATENT DOCUMENTS

| | | |
|---|---|---|
| JP | 2008-102819 A | 5/2008 |
| WO | 2009/130848 A1 | 10/2009 |

\* cited by examiner

Fig.6

RG management table 620

| RG# | PDEV# | RAID level | PDEV type | PDEV minimum capacity |
|---|---|---|---|---|
| 0 | 0,1,2,3 | RAID5 | FMPK | 1600G |
| 1 | 8,9,10,11,12,13,14,15 | RAID6 | FMPK | 800G |
| 2 | Unallocated | — | — | — |
| .. | .. | .. | .. | .. |
| 5 | 70, 80, 90, 100 | RAID5 | SAS | 300G |
| .. | .. | .. | .. | .. |

621  622  623  624  625

LU management table 630

| LU# 631 | RG# 632 | Stripe size 633 | LU start address 634 | LU size 635 |
|---|---|---|---|---|
| 0 | 0 | 64KB | 0x000000000 | 100GB |
| 1 | 0 | 128KB | 0x100000000 | 200GB |
| 2 | 1 | 64KB | 0x000000000 | 50GB |
| .. | .. | .. | .. | .. |
| 5 | 2 | 512KB | 0x200000000 | 2TB |
| .. | .. | .. | .. | .. |

Fig.8

Virtual page mapping table 650

| VVOL# | Virtual page ID | Real page ID |
|---|---|---|
| 0 | 000 | 002 |
| | 001 | 100 |
| | 002 | Unallocated |
| | 003 | 200 |
| | .. | .. |
| 1 | 100 | 000 |
| | 101 | 003 |
| | 102 | 202 |
| | 103 | Unallocated |
| | .. | .. |
| .. | .. | .. |

Real page state management table  660

| POOL# | Real page ID | State |
|---|---|---|
| 0 | 000 | In use |
| | 001 | Not in use |
| | 002 | In use |
| | 003 | In use |
| | .. | .. |
| .. | .. | .. |

Fig.10

PDEV management table 640

| PDEV# | Present user capacity | Initial user capacity | Start address | End address |
|---|---|---|---|---|
| 0 | 800 | 1600 | aaaaaaaa | bbbbbbbb |
| 1 | 1600 | 1600 | cccccccc | dddddddd |
| 2 | 800 | 1600 | eeeeeeee | ffffffff |
| .. | .. | .. | .. | .. |
| 5 | 400 | 400 | | |
| .. | .. | .. | .. | .. |

Page mapping management table 720

| Logical page number 721 | Physical page number 722 |
|---|---|
| 0 | 100 |
| 1 | 500 |
| 2 | Unallocated |
| .. | .. |
| 100 | 300 |
| .. | .. |
| 1000 | Unallocated |
| .. | .. |

Fig.15

Failure address list 750

| Failure address 751 | Length 752 |
|---|---|
| 100 | 1 |
| 500 | 2 |
| 312 | 100 |
| .. | .. |
| | |
| | |
| | |

Fig.29

PDEV management table  640b

| PDEV# | Present user capacity | Initial user capacity | Start address | End address | Alternate area presence or absence |
|---|---|---|---|---|---|
| 0 | 800 | 1600 | aaaaaaaa | bbbbbbbb | Present |
| 1 | 1600 | 1600 | cccccccc | dddddddd | Absent |
| 2 | 800 | 1600 | eeeeeeee | ffffffff | Absent |
| .. | .. | .. | .. | .. | .. |
| 5 | 400 | 400 | | | Absent |
| .. | .. | .. | .. | .. | .. |

PDEV alternate area management table 670

| Alternate area ID 671 | State 672 | PDEV# 673 | Start address 674 | End address 675 | Alternate source alternate area ID 676 | Alternate destination alternate area ID 677 |
|---|---|---|---|---|---|---|
| 0000 | Alternate source | 0 | gggggggg | hhhhhhhh | — | 0005 |
| 0001 | Not in use | 0 | iiiiiiii | jjjjjjjj | — | — |
| 0002 | Alternate destination | 1 | kkkkkkkk | mmmmmmmm | 1001 | — |
| .. | .. | .. | .. | .. | .. | .. |
| 0005 | Alternate destination | 6 | | | 0000 | — |
| .. | .. | .. | .. | .. | .. | .. |

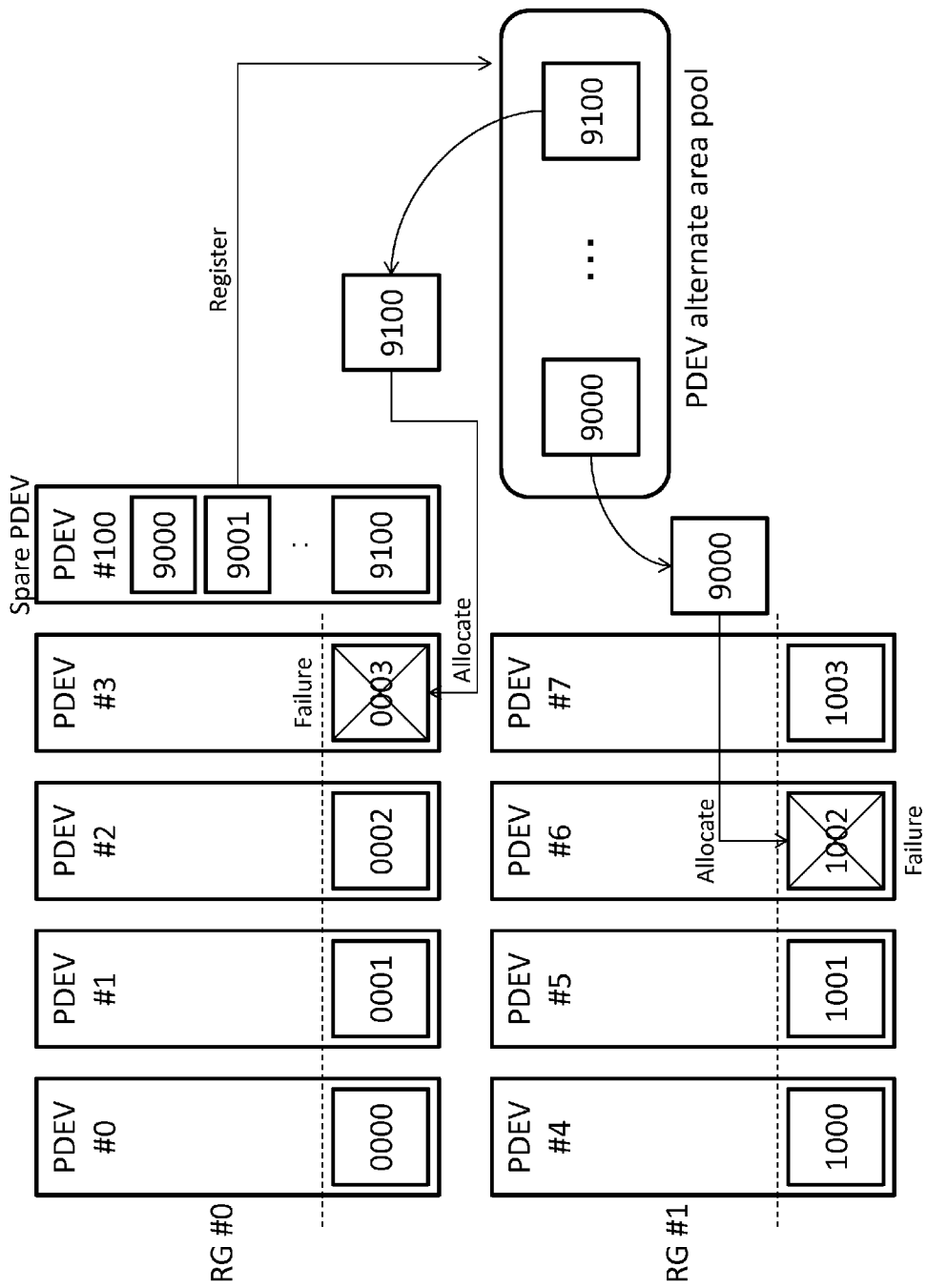

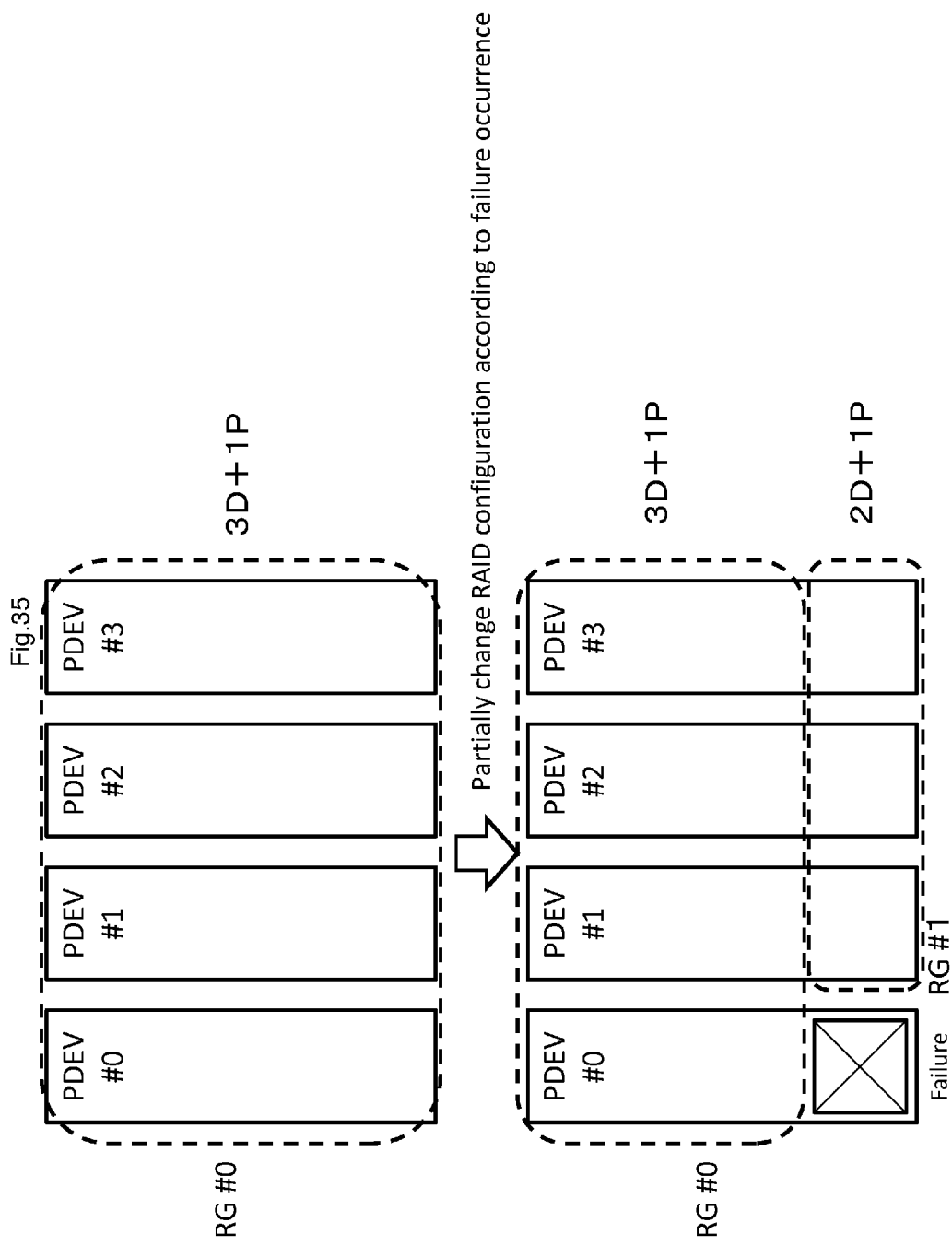

STORAGE APPARATUS AND STORAGE APPARATUS CONTROL METHOD

TECHNICAL FIELD

The present invention relates to a storage apparatus including a nonvolatile semiconductor memory.

BACKGROUND ART

In recent years, according to an increase in an amount of data handled in a company, a storage apparatus includes a large number of storage devices and the capacity of the storage device also increases year after year. As the storage device, in general, a HDD (Hard Disk Drive) is mounted. However, in recent years, instead of the HDD, a storage device (e.g., an SSD: Solid State Drive) including a nonvolatile semiconductor memory (e.g., a flash memory) as a storage medium attracts attention. The SSD is expensive but is extremely fast in I/O processing compared with the HDD.

In the flash memory, a physical storage area is managed in units called blocks. Erasing of data is performed in the block units. There is an upper limit in the number of times the block can be erased. When the number of times of erasing increases, data sometimes cannot be written in the flash memory or an error occurrence ratio of data written in the flash memory sometimes increases. That is, the flash memory has the life and the SSD including a large number of flash memories also has the life. In the flash memory, in general, fluctuation occurs in quality in units of dies, chips, or the like. A low-quality die is made unusable by a failure even if the number of times of erasing is smaller than a predetermined number of times of erasing. When such a failure occurs in a plurality of dies, a storage area for storing user data cannot be secured and the storage device has to be closed. When the SSD becomes unusable earlier than a predetermined period in this way, it is likely that the frequency of replacement increases and costs for purchase and maintenance of the SSD are incurred.

For example, PTL 1 discloses a technique for restoring data when a failure occurs in a block in an SSD. There is known a technique for rebuilding, when a failure of a block in a certain SSD is detected in a storage apparatus including a plurality of SSDs, all data of the SSD including the failure block in another SSD.

CITATION LIST

Patent Literature

[PTL 1]
U.S. Pat. No. 8,041,991

SUMMARY OF INVENTION

Technical Problem

In the technique of PTL 1, when a failure occurs in a part of a nonvolatile semiconductor memory in the storage device, even if there are a large number of other high-quality and usable portions (dies and chips of memories), the storage device is closed. Therefore, it is necessary to replace the storage device. When the storage device is increased in capacity, even if a failure occurs partially in the storage device, a usable capacity is still large. Therefore, when the entire storage device is closed for the failure in a part of the storage device, a waste of the capacity is large.

Solution to Problem

In order to solve the problems, a storage apparatus according to an aspect of the present invention includes: a plurality of storage devices; and a storage controller coupled to the plurality of storage devices and a host computer and configured to provide the host computer with a virtual volume. Each of the plurality of storage devices includes: a plurality of nonvolatile semiconductor memories; and a device controller configured to manage a failure that occurs partially in the plurality of nonvolatile semiconductor memories and provide the storage controller with a logical storage area associated with the plurality of nonvolatile semiconductor memories. The storage controller is configured to store, for each of the plurality of storage devices, a usable capacity, which is a capacity usable by the storage controller in the logical storage area, configure a first RAID group using a first storage device group among the plurality of storage devices, divide a logical storage area in the first RAID group into a plurality of pages, and allocate, on the basis of a write request from the host computer to the virtual volume, one of the plurality of pages in the first RAID group to the virtual volume. The device controller is configured to detect a partial failure in the plurality of nonvolatile semiconductor memories and transmit failure information indicating the detected failure to the storage controller. The storage controller is configured to reduce, when receiving first failure information indicating a failure in a first storage device in the first storage device group from the first storage device, a usable capacity of the first storage device on the basis of the first failure information.

Advantageous Effects of Invention

According to the aspect of the present invention, when a failure occurs in a part of the nonvolatile semiconductor memory in the storage device, by reducing a storable data capacity, it is possible to prevent the entire storage device from being closed and continue to use the storage device.

BRIEF DESCRIPTION OF DRAWINGS

FIG. 6 shows an RG management table 620.
FIG. 8 shows a virtual page mapping management table 650.
FIG. 9 shows a real page state management table 660.
FIG. 10 shows a PDEV management table 640.
FIG. 13 shows a page mapping management table 720.
FIG. 15 shows a failure address list 750.

FIG. 29 shows a PDEV management table 640b in the second embodiment.

FIG. 30 shows a PDEV alternate area management table 670.

FIG. 34 schematically shows allocation of an alternate area in a third embodiment.

FIG. 35 schematically shows a change of a RAID configuration in a fourth embodiment.

DESCRIPTION OF EMBODIMENTS

An overview of an embodiment is explained. In this embodiment, when a failure occurs in units of dies or the like in a nonvolatile semiconductor memory in a storage device, the storage device is closed in die units without being entirely closed. The storage device is continuously used with a capacity for storing user data reduced. A storage controller needs to recognize a change in the capacity of the user data storable in the storage device. Therefore, the storage device notifies storage controller of the change in the capacity. The storage controller performs processing for, for example, restoring data in a failure place and moving data equivalent to a reduced capacity to another storage device. Details of this embodiment are explained below.

First Embodiment

The configuration of a computer system in this embodiment is explained below.

Figure 1:
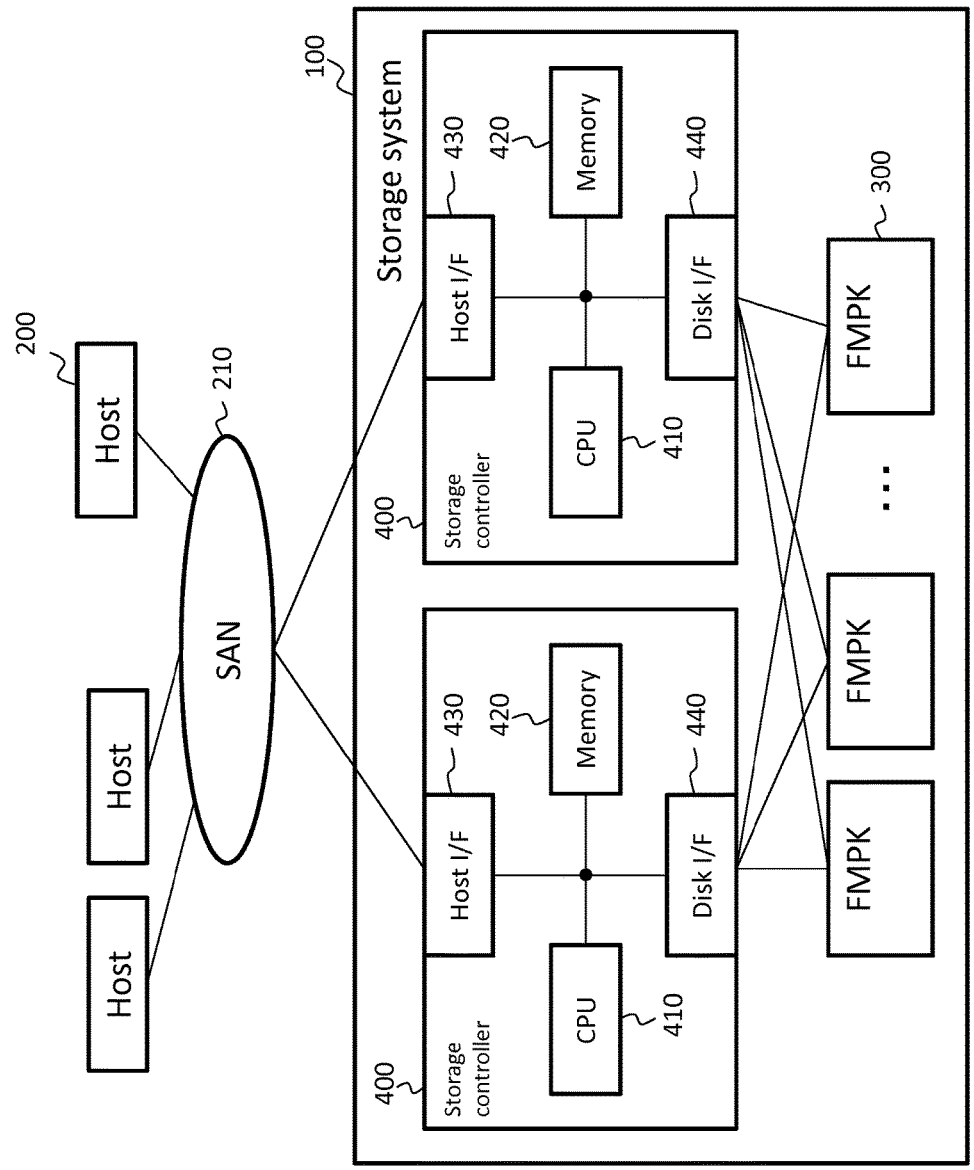
FIG. 1 shows the configuration of a computer system in a first embodiment of the present invention.

FIG. 1 shows the configuration of the computer system in the first embodiment of the present invention.

The computer system includes a storage system (a storage apparatus) 100 and a plurality of host computers 200. Each of the plurality of host computers 200 is coupled to the storage system 100 via a SAN (Storage Area Network) 210. The computer system may include one or more host computers 200.

The storage system 100 includes two storage controllers (DKCs: Disk Controllers) 400 and a plurality of FMPKs (Flash Memory Packages) 300. The storage controller 400 is, for example, a controller configured to control a plurality of storage devices as a RAID group. The two storage controllers 400 are made redundant. During normal time, one storage controller 400 controls the storage system 100. During occurrence of a failure of the storage controller 400, the other storage controller 400 continues the control of the storage system 100. In addition to the FMPK 300, other storage devices such as a SAS (Serial Attached Small Computer System Interface)-HDD (Hard Disk Drive) and a SATA (Serial Advanced Technology Attachment)-HDD may be used. In the following explanation and the drawings, such a storage device is sometimes referred to as PDEV (Physical Device).

The storage controller 400 provides the host computer 200 with a virtual volume. The storage controller 400 includes a CPU (Central Processing Unit) 410, a memory 420, a host I/F (Interface) 430, and a disk I/F 440. The units in the storage controller 400 are coupled to one another via a bus. The memory 420 stores a program for controlling the storage system 100. The memory 420 includes an area functioning as a cache memory for temporarily storing data read from a storage device and data written in the storage device. The CPU 410 controls the storage system 100 according to the program stored in the memory 420. The host I/F 430 is coupled to the SAN 210 and performs transmission and reception of data to and from the host computer 200. The disk I/F 440 is coupled to the FMPK 300 and performs transmission and reception of data to and from the FMPK 300.

Figure 2:
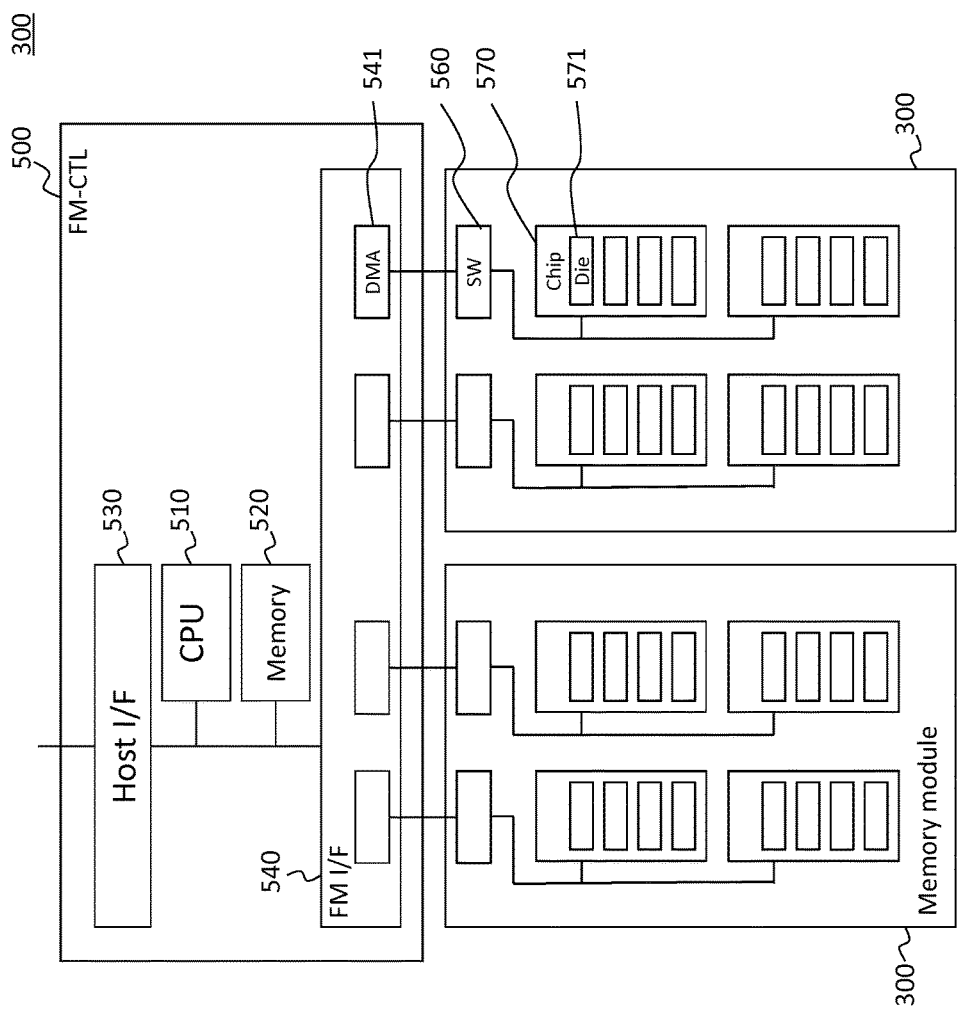
FIG. 2 shows the configuration of an FMPK 300.

FIG. 2 shows the configuration of the FMPK 300.

The FMPK 300 includes an FM-CTL (Flash Memory Controller, a device controller) 500 and a plurality of memory modules 310. The FM-CTL 500 includes a CPU 510, a memory 520, a host I/F 530, and a plurality of FM I/Fs 540. The units in the FM-CTL 500 are coupled to one another via a bus. The memory 520 stores a program for controlling the FMPK 300. The memory 520 stores data read from an FM chip and data written in the FM chip. The CPU 510 controls the FMPK 300 according to the program stored in the memory 520.

One memory module 310 is coupled to one FM I/F 540. The FM I/F 540 includes a plurality of DMA (Direct Memory Access) controllers 541. The memory module 310 includes a plurality of switches (SWs) 560 and a plurality of FM chips 570. One switch 560 is coupled to one DMA controller 541. The plurality of FM chips 570 are coupled to the one switch 560. The FM chip 570 includes a plurality of dies 571. The die 571 includes a plurality of blocks. The DMA controller 541 controls communication with the FM chip 570. In the following explanation and the drawings, the FM chip 570 is sometimes referred to simply as chip and the DMA controller 541 is sometimes referred to simply as DMA.

In the chip, it is likely that a failure occurs in units of pages, blocks, dies, planes, and the like. An occurrence ratio of the failure could be different depending on the quality of a flash memory. If the DMA fails, the chip cannot be accessed in DMA units. When a failure occurs in a page, a block, a plane, a die, a chip, or a DMA, a predetermined capacity is reduced from the capacity of the physical storage area for each of failure regions. In this embodiment, it is assumed that the capacities of pages, the capacities of blocks, the capacities of dies, the capacities of chips, and the numbers of chips coupled to DMAs are equal. However, the respective capacities may be different.

The FM-CTL 500 provides the storage controller 400 with a logical address space in the FMPK 300. A physical storage area in the FMPK 300 is associated with the logical address space. The physical storage area associated with the logical storage area provided to the outside of the FMPK 300 is referred to as user area. The logical address space is divided into logical pages of a predetermined size and managed inside the FMPK 300. Upon receiving a read/write request, which designates a logical address, from the storage controller 400, the FM-CTL 500 specifies a physical page from the logical address and executes read/write of data. The FM-CTL 500 manages a failure that occurs partially in the FMPK 300.

The physical storage area of the flash memory includes a plurality of blocks. Each of the blocks includes a plurality of pages. The block is a unit of erasing of data. The page is a unit of write and read of data. That is, the FM-CTL 500 erases data in block units and controls write and read of data in page units.

The flash memory has a characteristic that overwrite of data cannot be performed. Therefore, upon receiving data for updating data stored in a certain page (update data), the FM-CTL 500 writes the update data in a free page in which data is not stored. The FM-CTL 500 changes a correspondence relation between a logical page and a page before update to a correspondence relation between the logical page and a page after update. Therefore, the storage controller 400 does not need to change a logical address of an access destination.

The FM-CTL 500 manages the data before update as invalid data and manages the data after update as valid data. When the invalid data is erased, a page in which the invalid data is stored changes to a free page. Data can be written in the free page. Erasing is performed in block units. When the valid data and the invalid data are mixed in the block, the FM-CTL 500 copies the valid data to another free page and performs erasing of the data in the block. The copy of the valid data and the erasing processing for the block are referred to as reclamation.

In this way, in the flash memory, when a free page is absent, data cannot be written anew unless erasing of data is performed in block units. When the erasing processing is executed, data cannot be written until the erasing processing ends. Therefore, writing performance is deteriorated. Performance deterioration due to overhead of the erasing processing itself also occurs. Therefore, in a storage device including the flash memory as a storage medium, an area where the update data is written (an update area) is provided. As the capacity of the update area is larger, the frequency of the reclamation is smaller and the performance is maintained. However, when the capacity of the update area is large, the capacity of an area where user data is stored (a user area) is small. That is, a relation between a data capacity that the storage controller 400 can store in the FMPK 300 and the performance is determined by a ratio of the capacity of the user area and the capacity of the update area.

In the following explanation and the drawings, the capacity of the user area is sometimes referred to as user capacity, the capacity of the update area is sometimes referred to as update capacity, and a total of the user capacity and the update capacity is sometimes referred to as physical capacity. In this embodiment, the user capacity and the update capacity change according to occurrence of a failure. In this embodiment, the ratio of the user capacity and the update capacity is kept constant and the capacities are changed. Consequently, even when the capacities are reduced, the performance can be maintained.

Note that the user area and the update area do not need to be physically distinguished. For example, when a certain block is erased after being used as the user area, the block may be used as the update area.

Figure 3:
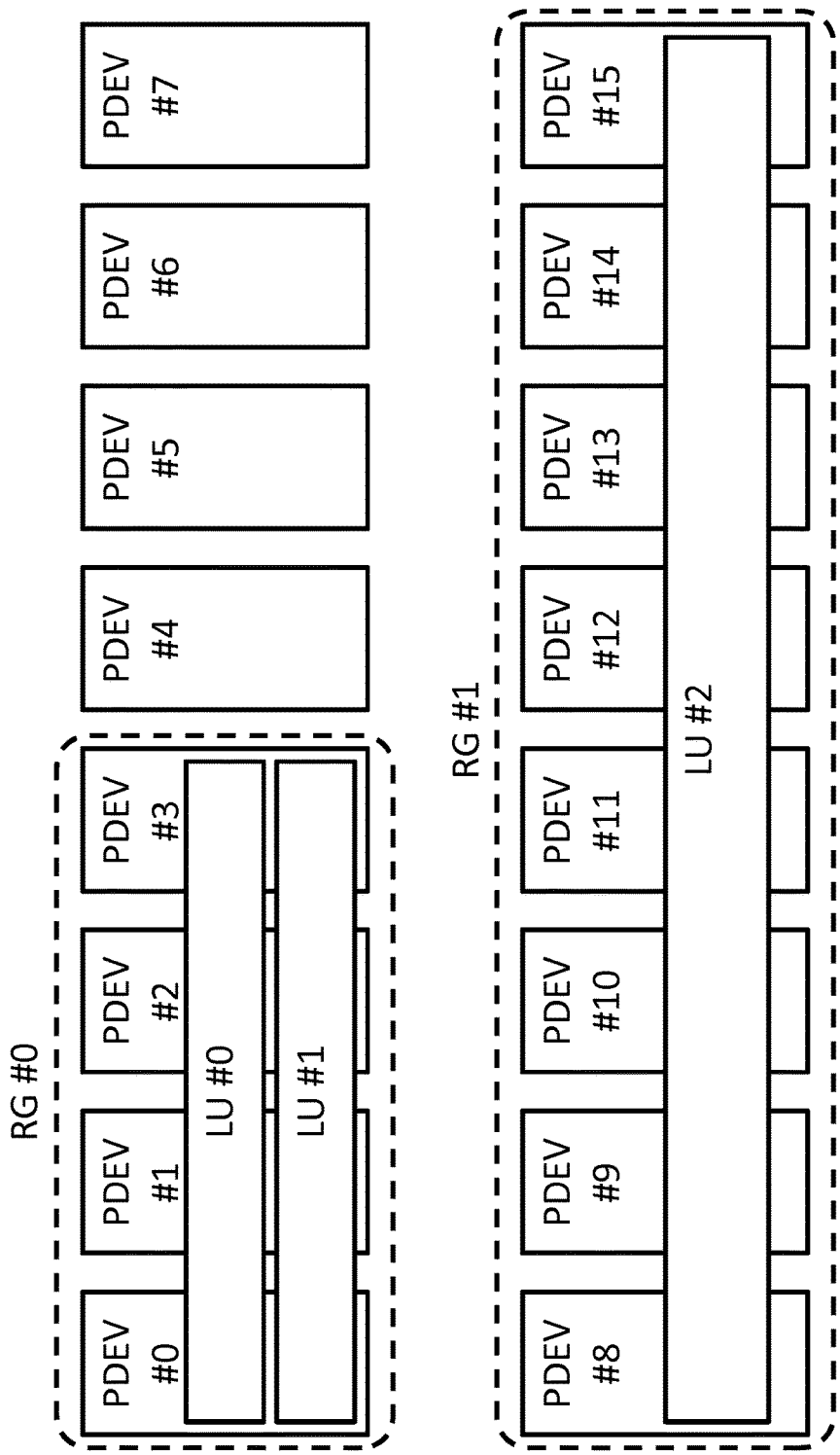
FIG. 3 shows the configurations of an RG (RAID Group) and an LU (Logical Unit) in a storage system 100.

FIG. 3 shows the configurations of an RG (RAID Group) and an LU (Logical Unit) in the storage system 100.

The storage controller 400 builds an RG using a plurality of PDEVs. In an example shown in the figure, the storage controller 400 builds an RG #0 using PDEVs #0 to #3 and builds an RG #1 using PDEVs #8 to #15 out of PDEVs #0 to #15. Each of the RGs includes a plurality of stripes. Each of the stripes extends over the plurality of PDEVs and includes a plurality of data and parity created from the plurality of data. For example, in the case of a RAID 5, an arrangement of the data and the parity in the plurality of PDEVs is different for each of the stripes. In the configuration of the RAID 5 of 3D+1P, one stripe includes three data and parity created from the three data. The storage controller 400 performs the creation of the parity. Further, the storage controller 400 allocates a storage area in the RG to an LU. In the example shown in the figure, the storage controller 400 allocates the RG #0 to LUs #0 and #1 and allocates the RG #1 to an LU #2.

Figure 4:
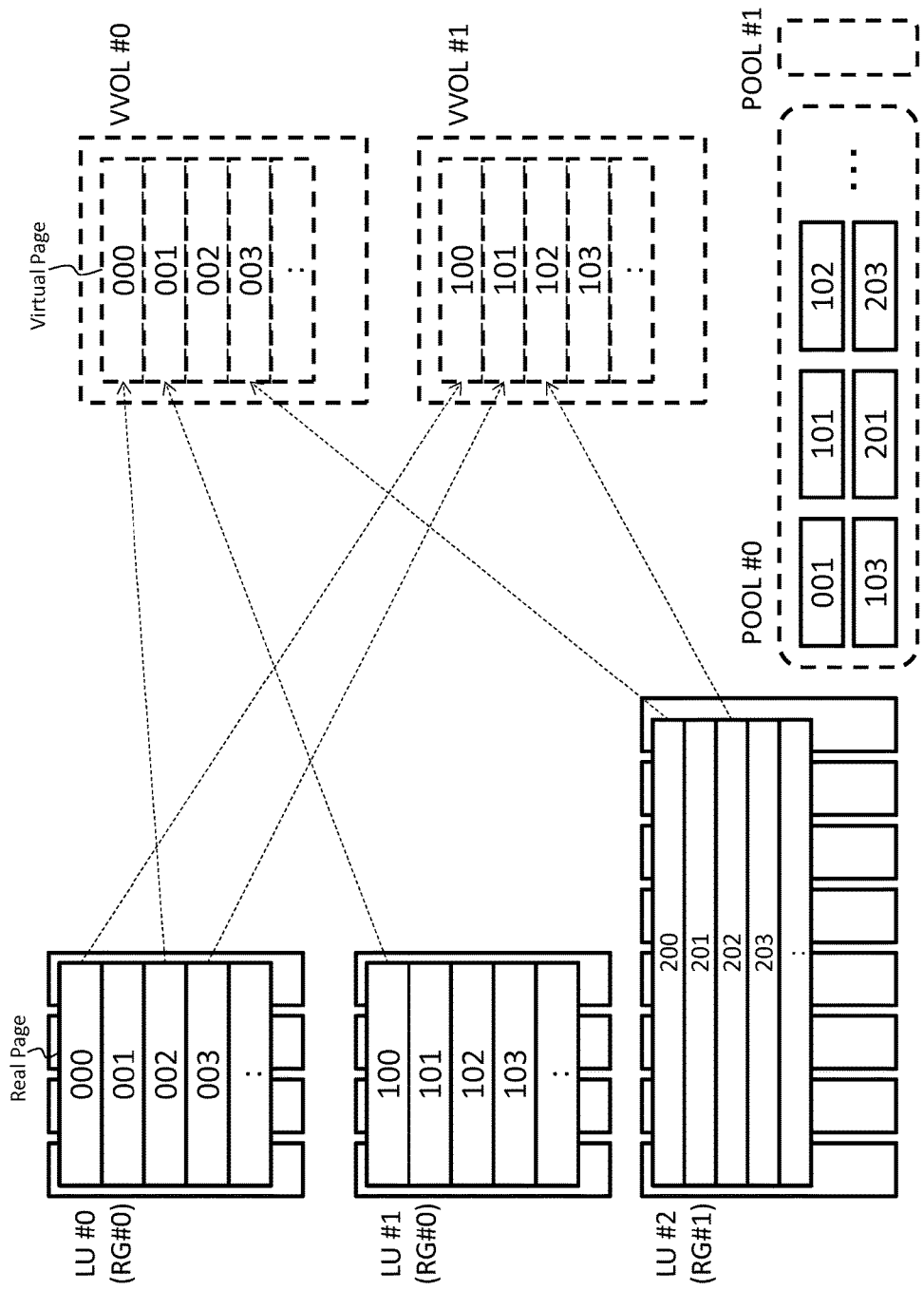
FIG. 4 shows the configurations of the LU and a VVOL (Virtual Volume) in the storage system 100.

FIG. 4 shows the configurations of the LU and a VVOL (Virtual Volume) in the storage system 100.

The storage controller 400 divides the LU into real pages, which are logical storage areas of a predetermined size, and manages the real pages. The storage controller 400 registers the real pages in a pool and manages the real pages. The storage controller 400 provides the host computer 200 with the VVOL. The storage controller 400 divides a virtual address space in the VVOL into virtual pages, which are virtual storage areas of a predetermined size, and manages the virtual pages. The storage controller 400 allocates, with a Thin Provisioning function, in response to a write request from the host computer 200, the real pages from the pool to the virtual pages in which a range of an address in the VVOL designated by the write request is included. When the storage controller 400 releases the allocation of the real page to the virtual page, the storage controller 400 returns the real page to the pool. In the example shown in the figure, the storage controller 400 registers the real pages in the LUs #0 to #2 in pools #0 and #1. Further, the storage controller 400 allocates the real pages in the pools #0 and #1 to the virtual pages in VVOLs #0 and #1.

Figure 5:
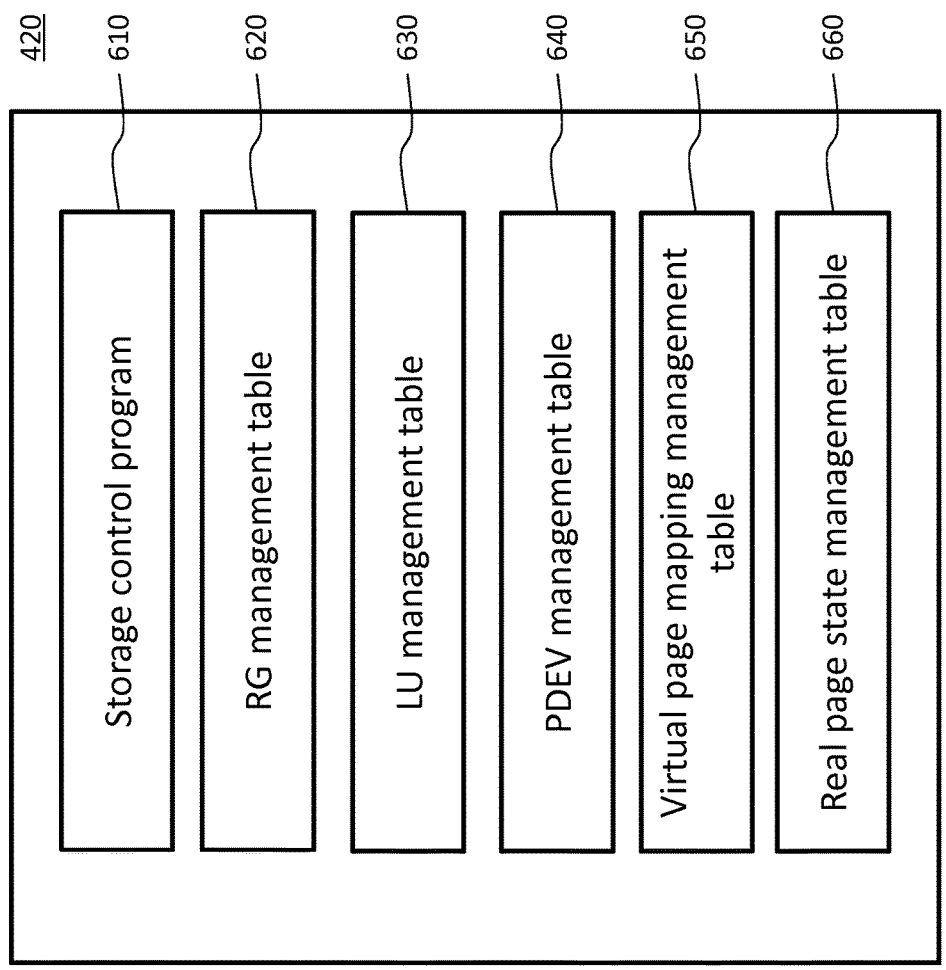
FIG. 5 shows information stored in a memory 420 of a storage controller 400.

FIG. 5 shows information stored in the memory 420 of the storage controller 400.

The memory 420 stores a storage control program 610, an RG management table 620, an LU management table 630, a PDEV management table 640, a virtual page mapping management table 650, and a real page state management table 660.

The storage control program 610 is a program for causing the CPU 410 to execute control of the storage system 100.

FIG. 6 shows the RG management table 620.

The RG management table 620 includes an entry for each of the RGs. The entry of a certain RG includes an RG number (RG #) 621 indicating the RG, a PDEV number (PDEV #) 622 indicating a PDEV belonging to the RG, a RAID level 623 of the RG, a PDEV type 624, which is a type of the PDEV belonging to the RG, and a PDEV minimum capacity 625, which is a minimum value of a user capacity of the PDEV belonging to the RG.

Figure 7:
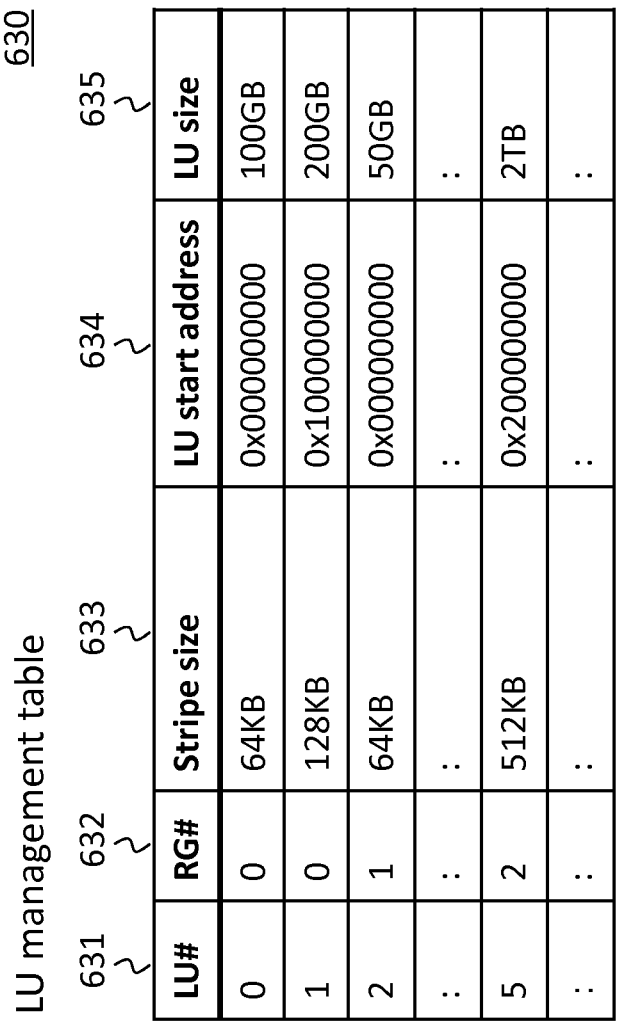
FIG. 7 shows an LU management table 630.

FIG. 7 shows the LU management table 630.

The LU management table 630 includes an entry for each of the LUs. The entry of a certain LU includes an LU number (LU #) 631 indicating the LU, an RG number (RG #) 632 indicating an RG allocated to the LU, a stripe size 633 of the LU, an LU start address 634, which is a start address of the LU in a logical address space in the RG, and an LU size 635, which is the size of the LU.

FIG. 8 shows a virtual page mapping management table 650.

The virtual page mapping management table 650 includes an entry for each of the virtual pages. The entry of a certain virtual page includes a VVOL number (VVOL #) 651 indicating a VVOL to which the virtual page belongs, a virtual page ID 652 indicating the virtual page, and a real page ID 653 indicating a real page allocated to the virtual page. When a real page is not allocated to the virtual page, the real page ID 653 indicates "unallocated". The virtual page ID 652 is an identifier unique in the storage system 100. The real page ID 653 is an identifier unique in the storage system 100.

FIG. 9 shows the real page state management table 660.

The real page state management table 660 includes an entry for each of the real pages. The entry of a certain real page includes a pool number (POOL #) 661 indicating a pool to which the real page belongs, a real page ID 662 indicating the real page, and a state 663 of the real page. The state 663 indicates whether the real page is allocated to a virtual page (in use).

FIG. 10 shows the PDEV management table 640.

The PDEV management table 640 includes an entry for each of the PDEVs. The entry of a certain PDEV includes a PDEV number (PDEV #) 641 indicating the PDEV, a present user capacity 642, which is a present user capacity of the PDEV, an initial user capacity 643, which is an initial user capacity of the PDEV, a start address 644 of a user area in a logical address space (an FMPK logical address space) of the PDEV, and an end address 645 of the user area in the logical address space of the PDEV. The FMPK logical address space is represented by, for example, an LBA (Logical Block Address).

Figure 11:
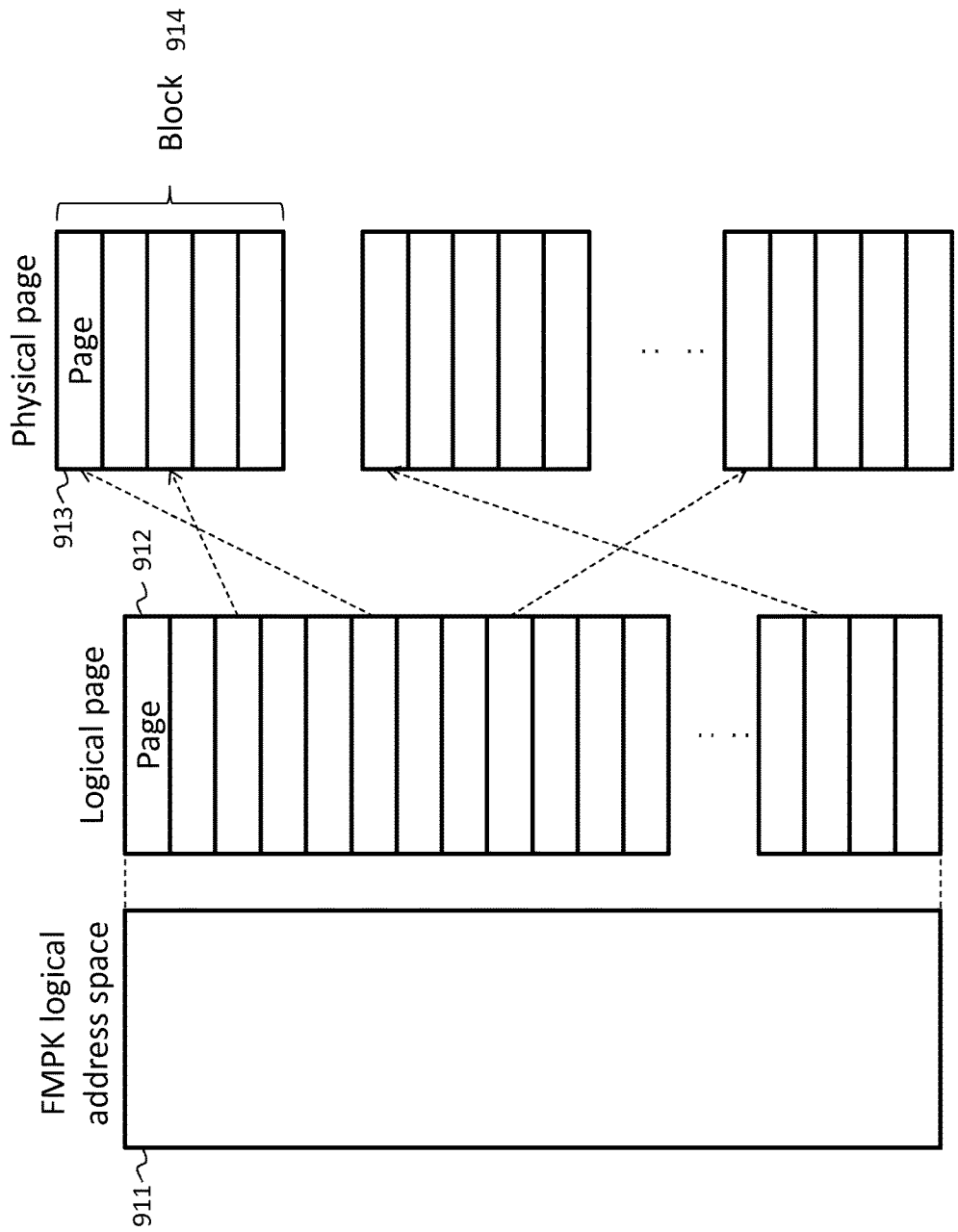
FIG. 11 shows the configurations of a logical page and a physical page of the FMPK 300.

FIG. 11 shows the configurations of a logical page and a physical page of the FMPK 300.

The FM-CTL 500 provides the storage controller 400 with a logical address space 911 and divides the logical address space 911 into logical pages 912 of a predetermined size (e.g., 8 kB) and manages the logical pages 912. The FM-CTL 500 divides the block into physical pages 913 of a predetermined page size and manages the physical pages 913. The FM-CTL 500 allocates the physical page 913 to the logical page 912. A block 914 includes a predetermined number of the physical pages 913. The FM-CTL 500 performs read of data from and write of data in the FM chip 570 in physical page 913 units and performs erasing from the FM chip 570 in block 914 units.

Figure 12:
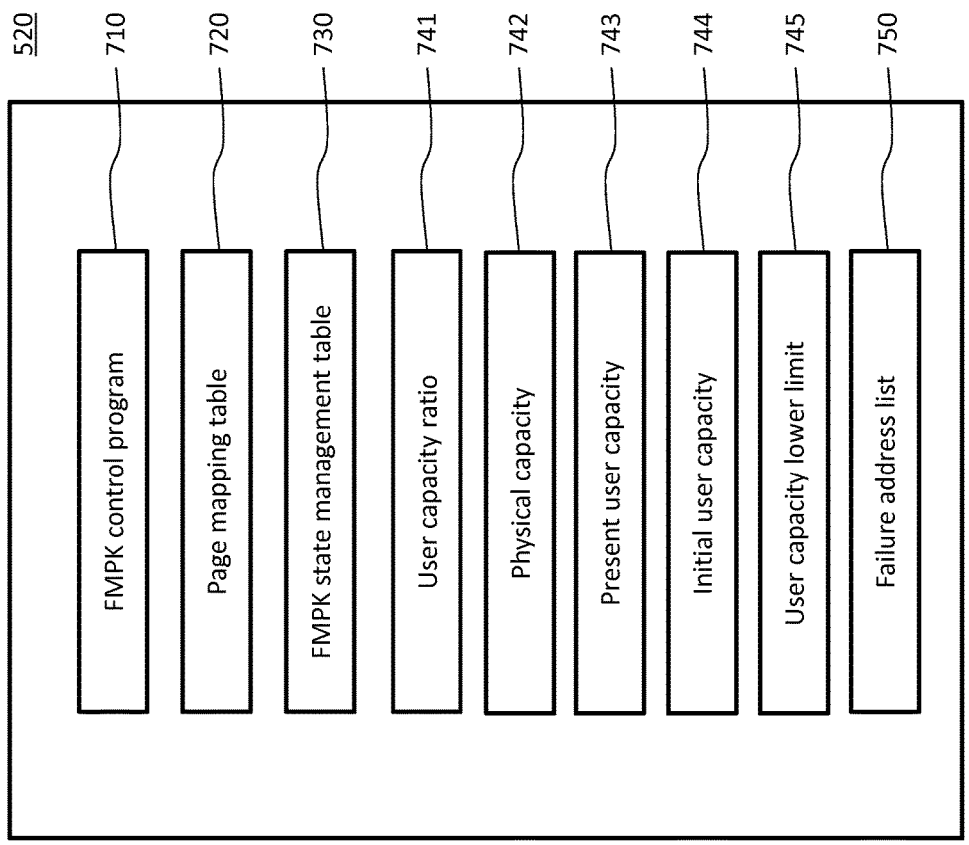
FIG. 12 shows information stored in a memory 520 of an FM-CTL 500.

FIG. 12 shows information stored in the memory 520 of the FM-CTL 500.

The memory 520 stores an FMPK control program 710, a page mapping management table 720, an FMPK state management table 730, a user capacity ratio 741, a physical capacity 742, a present user capacity 743, an initial user capacity 744, a user capacity lower limit 745, and a failure address list 750. The user capacity ratio 741, the physical capacity 742, the initial user capacity 744, and the user capacity lower limit 745 are set in advance and stored in the memory 520. The present user capacity 743 is equal to the initial user capacity 744 during an operation start. However, the present user capacity 743 decreases when a failure occurs in the physical storage area in the FMPK 300. The user capacity ratio 741 is a ratio of the present user capacity 743 to a total capacity of physical storage areas (the user area and the update area) without a failure. In this embodiment, the user capacity ratio 741 is fixed.

FIG. 13 shows the page mapping management table 720.

The page mapping management table 720 includes an entry for each of the logical pages. The entry of a certain logical page includes a logical page number 721 indicating the logical page and a physical page number 722 indicating a physical page allocated to the logical page. When a physical page is not allocated to the logical page, the physical page number 722 indicates unallocated.

Figure 14:
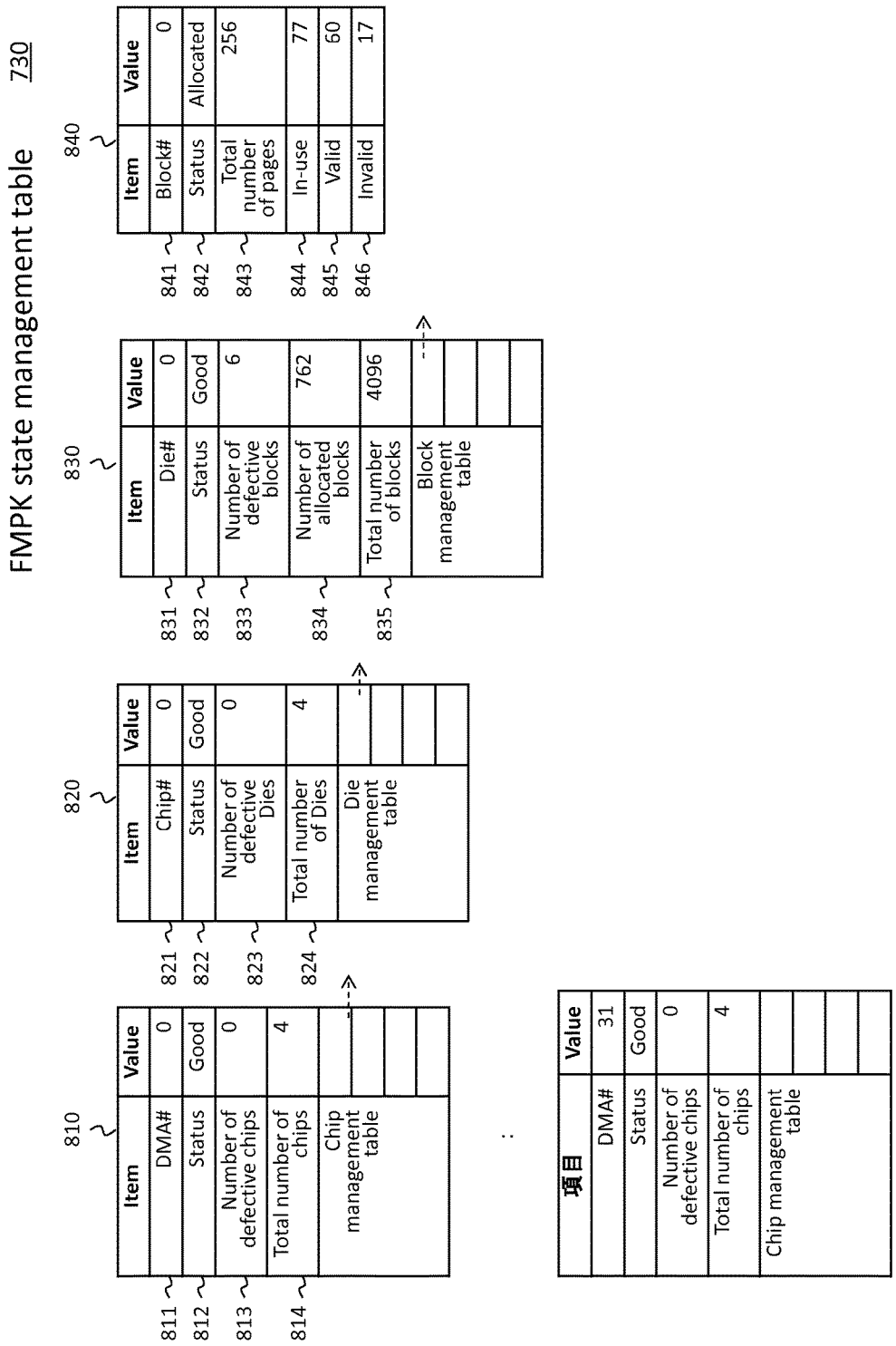
FIG. 14 shows an FMPK state management table 730.

FIG. 14 shows the FMPK state management table 730.

The FMPK state management table 730 includes a DMA management table 810 for each of the DMAs.

The DMA management table 810 of a certain DMA includes a DMA number (DMA #) 811 indicating the DMA, a Status 812 of the DMA, a number of defective chips 813 in all chips belonging to the DMA, a total number of chips 814 belonging to the DMA, and a chip management table 820 for each of the chips belonging to the DMA. The Status 812 shows Good if the DMA is usable and shows Bad otherwise.

The chip management table 820 of a certain chip includes a chip number (Chip #) 821 indicating the chip, a Status 822 of the chip, a number of defective dies 823 in all dies in the chip, a total number of dies 824 in the chip, and a die management table 830 for each of the dies in the chip. The Status 822 shows Good if the chip is usable and shows Bad otherwise.

The die management table 830 of a certain die includes a die number (Die #) 831 indicating the die, a Status 832 of the die, a number of defective blocks 833 in all blocks in the die, a number of allocated blocks 834, which is the number of blocks allocated to a logical page in the die, a total number of blocks 835 in the die, and a block management table 840 for each of the blocks in the die. The Status 832 shows Good if the die is usable and shows Bad otherwise.

The block management table 840 of a certain block includes a block number (Block #) 841 indicating the block, a Status 842 of the block, a total number of pages 843 in the block, an In-use 844, which is the number of pages (in use) that stores data in all pages in the block, a Valid 845, which is the number of valid pages in the page in use, and an Invalid 846, which is the number of invalid pages in the page in use. The Status 842 shows "Allocated" if the block is usable and stores data and shows "Unallocated" if the block is usable and does not store data. Further, the Status 842 shows "failure" when a failure occurs in the block and shows "life" when the number of times of rewrite of the block exceeds a threshold.

In this embodiment, failures in DMA, chip, die, and block units are explained as examples. However, occurrence of a failure in other physical units such as plane may be managed.

FIG. 15 shows the failure address list 750.

The failure address list 750 includes, in the FMPK 300, an entry for each failure areas, which are logical address areas (logical address ranges) in an FMPK logical address space corresponding to a physical storage area where a failure occurs. A certain entry includes a failure address 751, which is a start LBA of the failure area, and a length 752, which is the length of the failure area.

When a failure occurs in a physical storage area, data stored in the physical storage area is lost. The FM-CTL 500 cannot restore the lost data. Therefore, the FM-CTL 500 specifies a logical address area corresponding to the physical storage area where the failure occurs and notifies the storage controller 400 of the logical address area. Consequently, the storage controller 400 can restore the data. The storage controller 400 cannot recognize the failure in the physical storage area. Therefore, when a logical address area cannot be acquired from the FM-CTL 500, the storage controller 400 needs to restore all data in the FMPK 300. As the capacity of the FMPK 300 is larger, restoration processing for the data takes longer time. Redundancy is deteriorated during the time. However, since the FM-CTL 500 notifies the storage controller 400 of a specific logical address area as in this embodiment, the storage controller 400 can restore data in an appropriate range. Therefore, it is possible to complete the restoration processing for the data in a short time. Since time in which redundancy is deteriorated is reduced, reliability of the storage system is improved.

The operation of the storage system 100 is explained.

Figure 16:
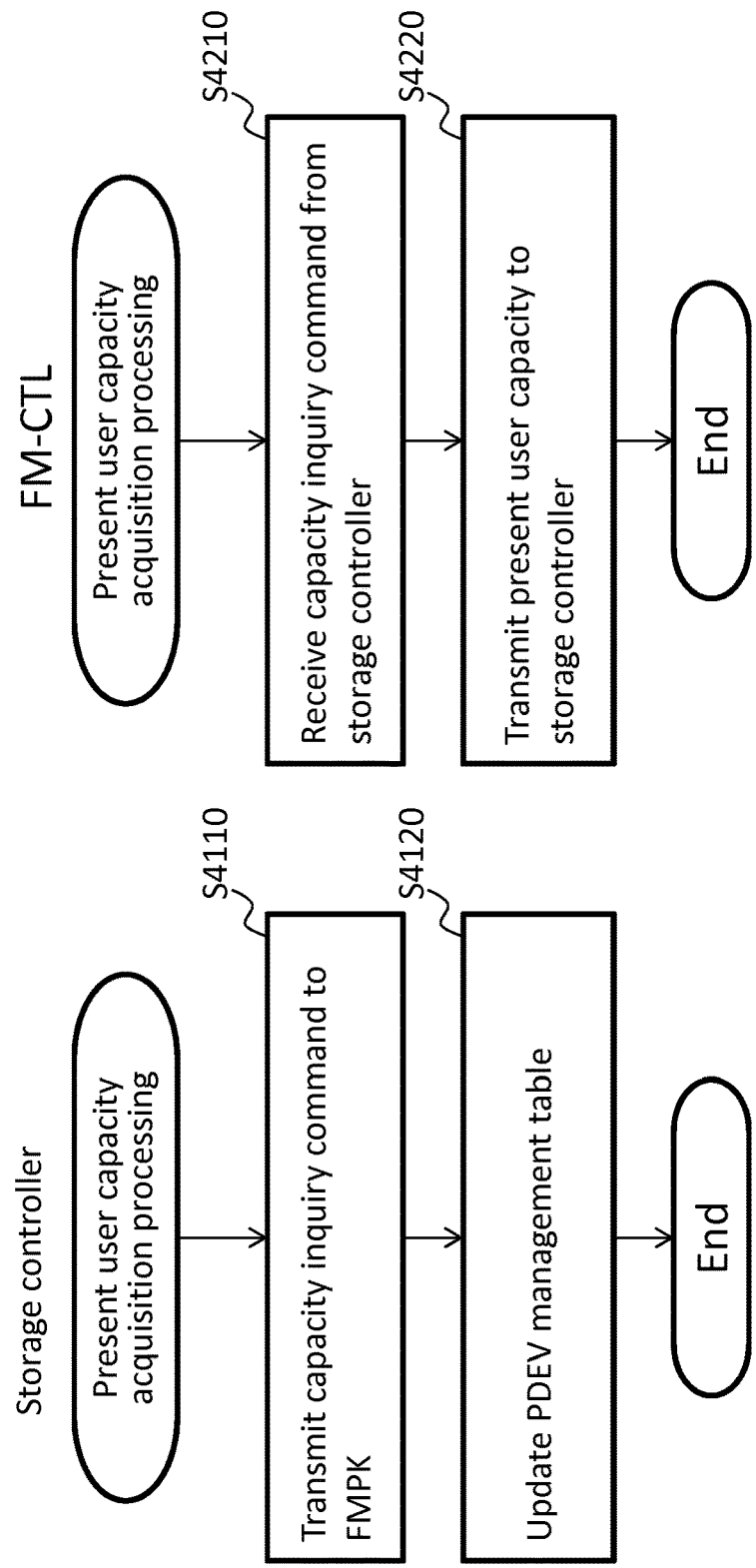
FIG. 16 shows present user capacity acquisition processing.

FIG. 16 shows present user capacity acquisition processing.

The storage controller 400 executes the present user capacity acquisition processing for acquiring a present user capacity of a target FMPK. When the FMPK 300 is installed in the storage system 100, the storage controller 400 sets the FMPK 300 as the target FMPK and acquires the present user capacity. The storage controller 400 may periodically perform present user capacity update processing.

The storage controller 400 transmits a capacity inquiry command to the target FMPK to thereby receive a present user capacity from the target FMPK (S4110), updates, with the received present user capacity, the present user capacity 642 of the target FMPK in the PDEV management table 640 (S4120), and ends the present user capacity acquisition processing.

Upon receiving the capacity inquiry command from the storage controller 400 (S4210), the FM-CTL 500 transmits the present user capacity 743 in the memory 520 to the storage controller 400 (S4220) and ends the present user capacity acquisition processing. The present user capacity acquisition processing is as explained above.

With the present user capacity acquisition processing, the storage controller 400 can acquire a present user capacity of the FMPK 300.

Figure 17:
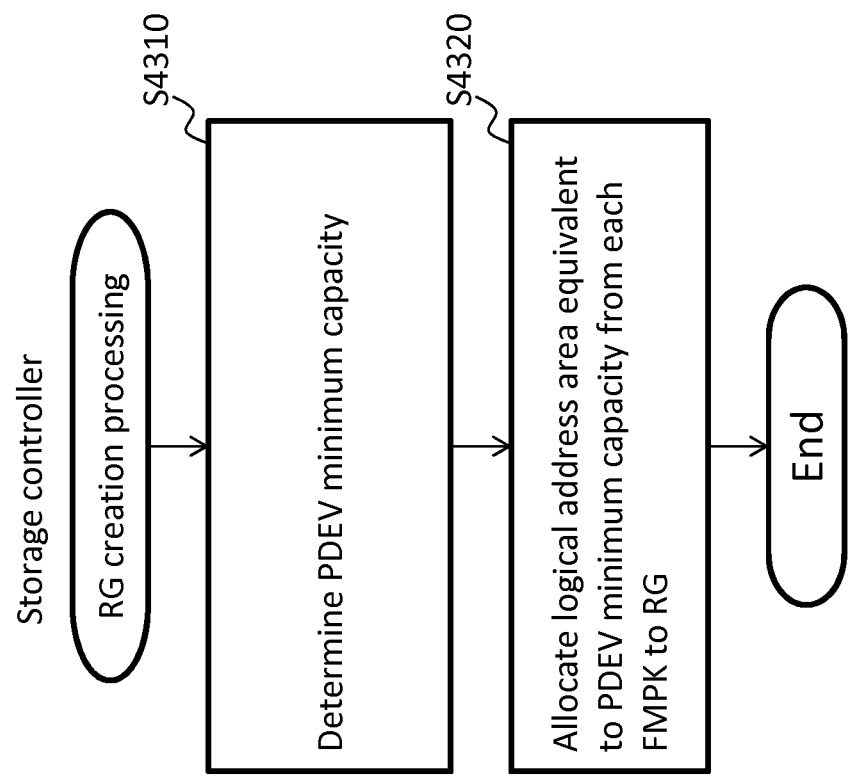
FIG. 17 shows RG creation processing.

FIG. 17 shows RG creation processing.

When a new RG is created using a plurality of the FMPKs 300, the storage controller 400 determines a capacity used for the RG concerning each of the plurality of FMPKs 300 and executes the RG creation processing for creating the RG.

The storage controller 400 detects, from the PDEV management table 640, a minimum value of the present user capacity 642 of the FMPK 300 belonging to the RG and sets the minimum value as a PDEV minimum capacity of the RG (S4310). Thereafter, the storage controller 400 creates the RG using a logical address area equivalent to the PDEV minimum capacity in each of all the FMPKs 300 belonging to the RG, inputs the PDEV minimum capacity to the PDEV minimum capacity 625 of the RG in the RG management table 620 (S4320), and ends the RG creation processing. The RG creation processing is as explained above. The storage controller 400 stripes and stores the data in the plurality of PDEVs belonging to the RG. In order to stripe and store the data, a free capacity of the same size is necessary in the PDEVs in the RG. That is, when the free capacity is absent in a certain PDEV, the data cannot be stored even if the free capacity is present in the other PDEVs in the RG. Therefore, when a user capacity of a certain PDEV is reduced, even if the free capacity is present in the other PDEVs in the RG, the RG cannot store the data. Therefore, the storage controller 400 creates the RG according to the PDEV minimum capacity.

With the RG creation processing, it is possible to create an RG having an appropriate capacity according to the present user capacity of the FMPK 300 belonging to the RG.

Figure 18:
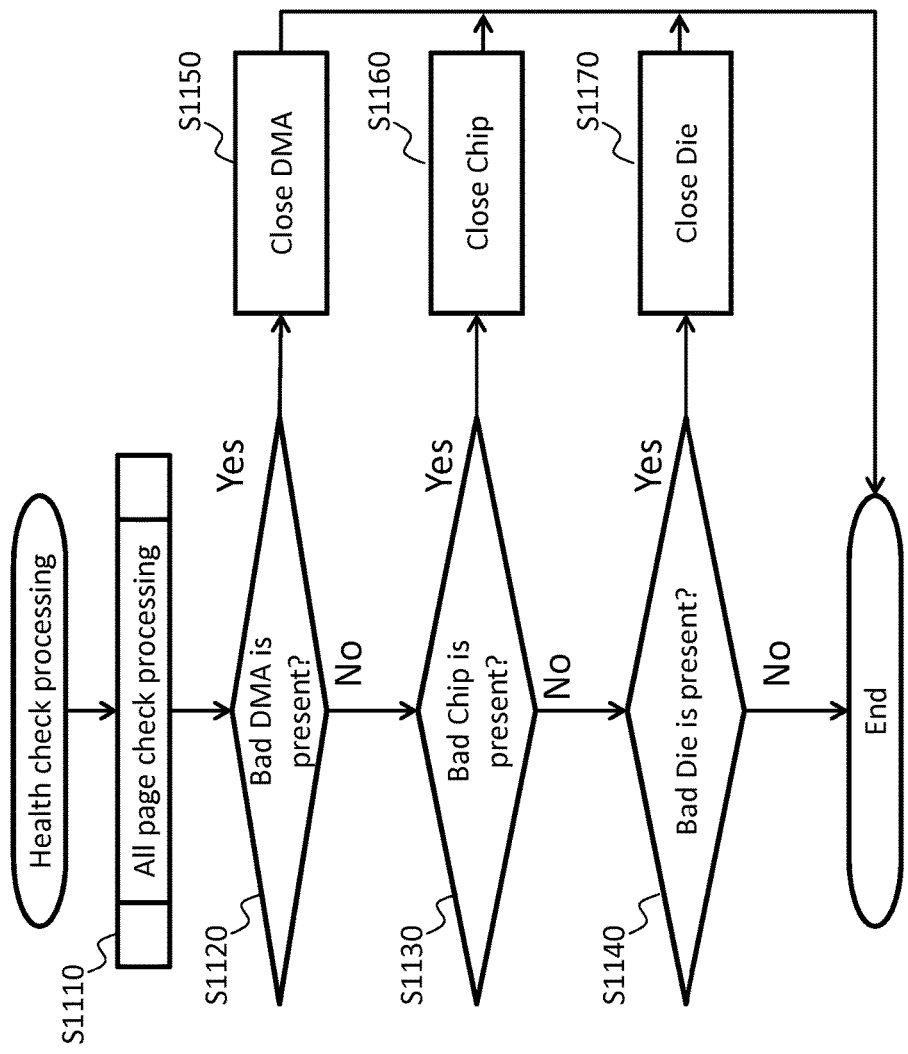
FIG. 18 shows health check processing by the FM-CTL 500.

FIG. 18 shows health check processing by the FM-CTL 500.

The FM-CTL 500 periodically executes, in the background, health check processing for detecting a state of the FMPK 300.

The FM-CTL 500 executes, in the FMPK 300, all page check processing for detecting the Statuses 812 of all the DMAs, the Statuses 822 of all the chips, and the Statuses 832 of all the dies (S1110). The FM-CTL 500 performs detection of a DMA, a chip, and a die having failures according to the all page check processing. The FM-CTL 500 stores a result of the all page check processing in the FMPK state management table 730. The all page check processing is explained below.

Thereafter, the FM-CTL 500 determines, on the basis of the FMPK state management table 730, whether a DMA, the Status 812 of which is Bad, (Bad DMA) is present (S1120). When it is determined that the Bad DMA is present (S1120: Yes), the FM-CTL 500 closes the Bad DMA (S1150) and ends the health check processing. Otherwise (S1120: No), the FM-CTL 500 determines whether a chip, the Status 822 of which is Bad, (Bad Chip) is present (S1130). When it is determined that the Bad Chip is present (S1130: Yes), the FM-CTL 500 closes the Bad Chip (S1160) and ends the health check processing. Otherwise (S1130: No), the FM-CTL 500 determines whether a die, the Status 832 of which is Bad, (Bad Die) is present (S1140). When it is determined that the Bad Die is present (S1140: Yes), the FM-CTL 500 closes the Bad Die (S1170) and ends the health check processing. Otherwise (S1140: No), the FM-CTL 500 ends the health check processing. The health check processing is as explained above.

The FM-CTL 500 determines, on the basis of a result of the health check processing, whether valid data is stored or invalid data is stored in a physical page included in a physical storage area where a failure occurs. This is because, when a failure occurs in the physical page in which the valid data is stored, it is necessary to recover the data. A number of the physical page in which the valid data is stored is recorded in the page mapping management table 720. Therefore, the FM-CTL 500 can specify, using the page mapping management table 720, a logical page number corresponding to the number of the physical page in which the valid data is stored. The FM-CTL 500 specifies a logical address area on an FMPK logical address space from the logical page number and stores the logical address area in the memory 520 as the failure address list 750. The FM-CTL 500 can store a logical address area corresponding to the physical storage area where the failure occurs in the failure address list 750, notify the storage controller 400 of the logical address area, and receive the recovered data from the storage controller 400. When the invalid data is stored in the physical page in which the failure occurs, since it is unnecessary to recover the data, the FM-CTL 500 does not store the invalid data in the failure address list 750. The FM-CTL 500 subtracts the capacity of the closed physical storage area from the physical capacity 742 and stores the capacity in the memory 520.

Note that the FM-CTL 500 may store a list of physical page numbers in the memory 520 and manage whether valid data is stored or invalid data is stored in each of physical pages. Further, the FM-CTL 500 may store, in the list, a logical page number associated with a physical page number. When the FM-CTL 500 detects a failure of a physical page, the FM-CTL 500 can specify, using the list, a logical page corresponding to the physical page in which the valid data is stored.

With the health check processing, by closing only a portion where a failure occurs, it is possible to allow access to other portions.

Figure 19:
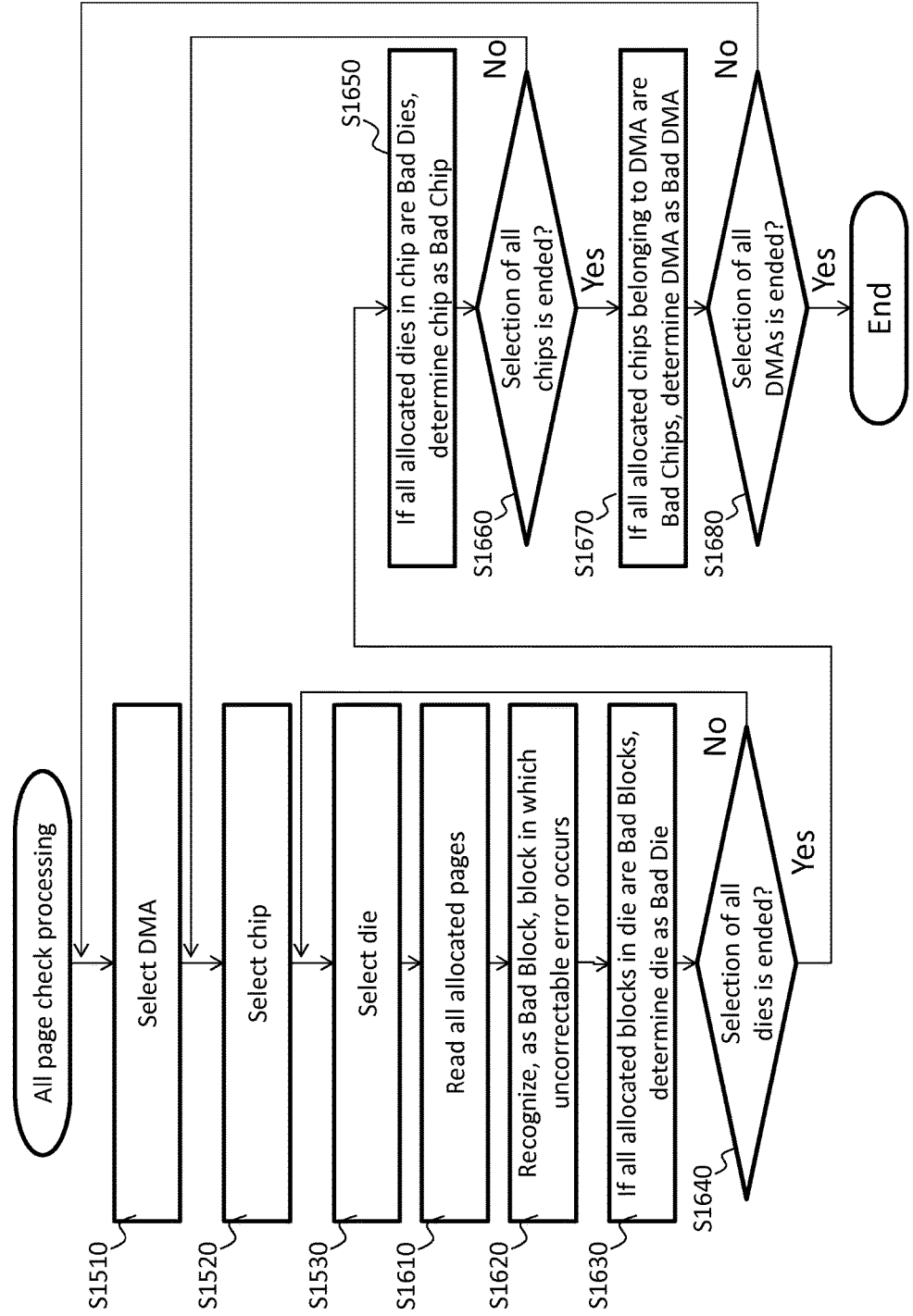
FIG. 19 shows all page check processing by the FM-CTL 500.

FIG. 19 shows the all page check processing by the FM-CTL 500.

In S1110, the FM-CTL 500 executes the all page check processing. The FM-CTL 500 stores a result of the all page check processing in the FMPK state management table 730. That is, the FM-CTL 500 stores presence or absence of a failure for each unit of DMAs, chips, or the like.

The FM-CTL 500 selects unselected one DMA out of all the DMAs in the FMPK 300 (S1510). The FM-CTL 500 selects unselected one chip out of all the chips belonging to the selected DMA (S1520). The FM-CTL 500 selects unselected one die out of all the dies in the selected chip (S1530).

Thereafter, the FM-CTL 500 executes Read of all allocated pages in all allocated blocks in the selected die (S1610). Thereafter, as a result of the Read, the FM-CTL 500 recognizes a block in which an uncorrectable error occurs as a Bad Block (S1620). As a condition for the Bad Block, other conditions may be used. Thereafter, when all the allocated blocks in the selected die are Bad Blocks, the FM-CTL 500 determines that the die is a Bad Die (S1630). Note that, as a condition for the Bad Die, other conditions may be used. For example, when a predetermined number or more blocks among the allocated blocks in the selected die are Bad Blocks, the FM-CTL 500 may determine that the die is a Bad Die.

Thereafter, the FM-CTL 500 determines whether selection of all the dies in the selected chip is ended (S1640). When it is determined that the selection of all the dies is not ended (S1640: No), the FM-CTL 500 shifts the processing to S1530.

When it is determined that the selection of all the dies is ended (S1640: Yes), if all the dies in the selected chip are Bad Dies, the FM-CTL 500 determines that the chip is a Bad Chip (S1650). Note that, as a condition for the Bad Chip, other conditions may be used. For example, when a predetermined number or more of dies among the dies in the selected chip are Bad Dies, the FM-CTL 500 may determine that the chip is a Bad Chip.

Thereafter, the FM-CTL 500 determines whether selection of all the chips belonging to the selected DMA is ended (S1660). When it is determined that the selection of all the chips is not ended (S1660: No), the FM-CTL 500 shifts the processing to S1520.

When it is determined that the selection of all the chips is ended (S1160: Yes), if all the chips belonging to the selected DMA are Bad Chips, the FM-CTL 500 determines that the chip is a Bad DMA (S1670). Note that, as a condition for the Bad DMA, other conditions may be used. For example, when a predetermined number or more of chips among the chips belonging to the selected DMA are Bad Chips, the FM-CTL 500 may determine that the DMA is a Bad DMA.

Thereafter, the FM-CTL 500 determines whether selection of all the DMAs in the FMPK 300 is ended (S1680). When the selection of all the DMAs is not ended (S1680: No), the FM-CTL 500 shifts the processing to S1510.

When it is determined that the selection of all the DMAs is ended (S1680: Yes), the FM-CTL 500 ends the all page check processing. The all page check processing is as explained above.

With the all page check processing, the FM-CTL 500 can detect a portion where a failure occurs in the FMPK 300.

Figure 20:
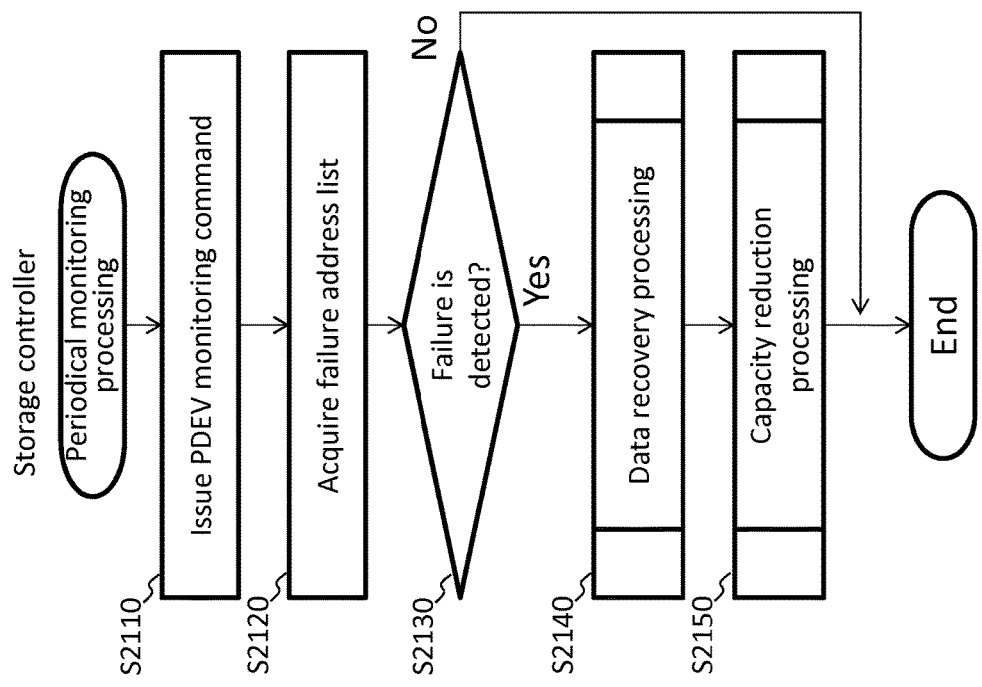
FIG. 20 shows periodical monitoring processing.

FIG. 20 shows periodical monitoring processing.

The storage controller 400 periodically executes the periodical monitoring processing for periodically selecting one of the FMPKs 300 as a target FMPK and acquiring a state of the target PDEV. The storage controller 400 periodically executes the periodical monitoring processing for each of all the PDEVs.

The storage controller 400 issues a PDEV monitoring command to the target FMPK (S2110). The FM-CTL 500 receives the PDEV monitoring command and transmits the failure address list 750 to the storage controller 400 as a response to the PDEV monitoring command.

Thereafter, the storage controller 400 receives the failure address list 750 from the target FMPK (S2120). Thereafter, the storage controller 400 determines, on the basis of the failure address list 750, whether a failure is detected (S2130). When it is determined that a failure is not detected (S2130: No), the storage controller 400 ends the periodical monitoring processing. When it is determined that a failure is detected (S2130: Yes), the storage controller 400 recognizes the target FMPK as a failure FMPK, executes data recovery processing for recovering data lost in the failure FMPK (S2140), recognizes an RG to which the failure FMPK belongs as a failure RG, executes capacity reduction processing for reducing a user capacity of the FMPK 300 belonging to the failure RG (S2150), and ends the periodical monitoring processing. The data recovery processing and the capacity reduction processing are explained below. The periodical monitoring processing is as explained above.

Note that, when a failure occurs, the FM-CTL 500 may transmit UA (Unit Attention) to the storage controller 400 as a response to a Read command and a Write command to thereby inform the storage controller 400 that the failure occurs. In this case, the storage controller 400 may acquire the failure address list 750 according to a PDEV monitoring command. The FM-CTL 500 may notify the storage controller 400 of a failure area according to rules set in advance for the storage controller 400 and the FM-CTL 500. For example, the FM-CTL 500 detects a failure for each of logical address areas of a report size (e.g., 256 kB), which is a size set in advance, and transmits only a start address of the logical address area where the failure is detected to the storage controller 400. The storage controller 400 receives the start address and recovers data in the logical address area of the report size specified by the start address.

Figure 21:
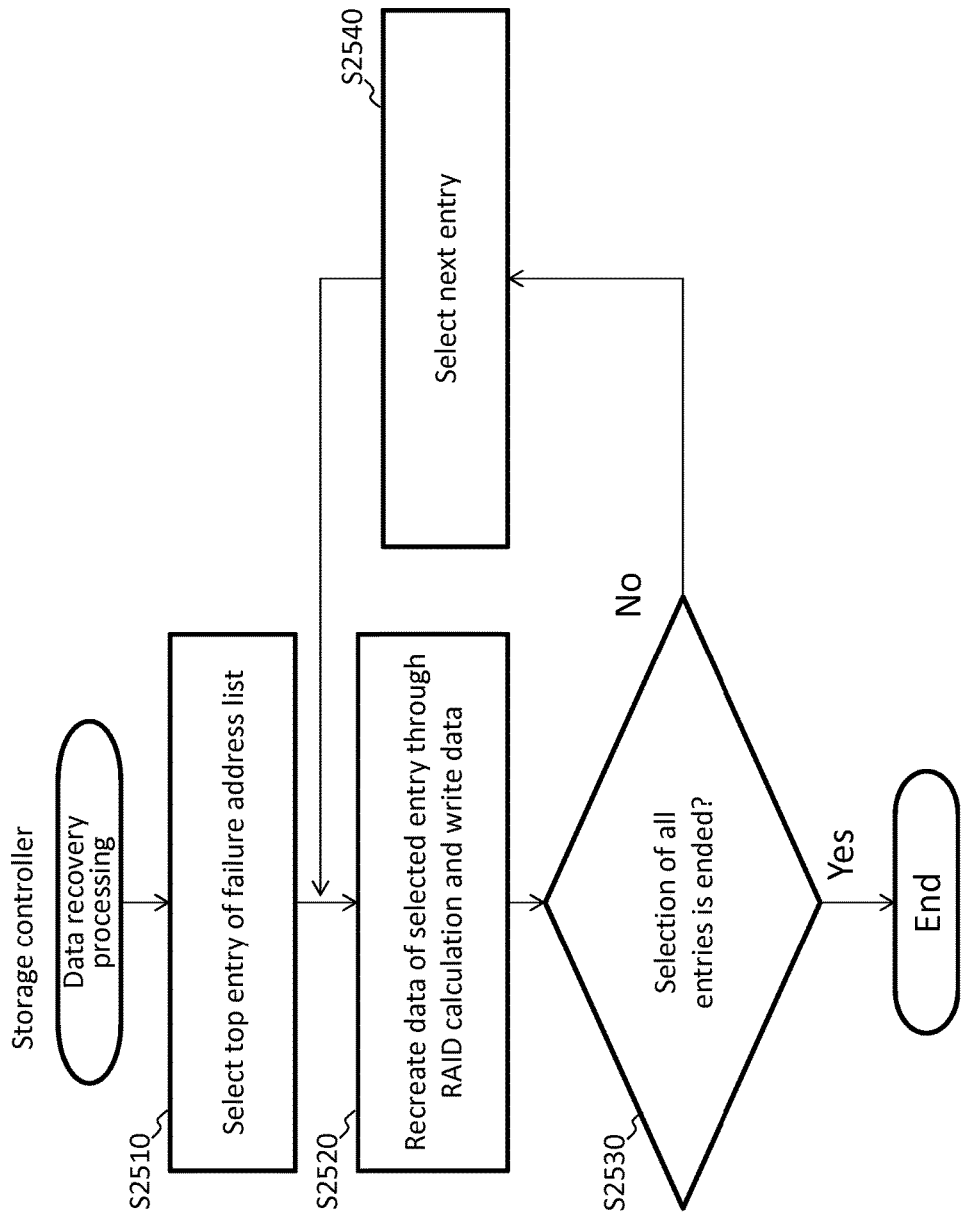
FIG. 21 shows data recovery processing.

FIG. 21 shows the data recovery processing.

In S2140, the storage controller 400 executes the data recovery processing.

The storage controller 400 selects one entry in order from the top of the failure address list 750 acquired from the failure FMPK and recognizes a failure area from the selected entry (S2510).

Thereafter, the storage controller 400 specifies, on the basis of the RG management table 620, the FMPK 300 other than the failure FMPK belonging to the failure RG and specifies, on the basis of the LU management table 630, a stripe corresponding to the failure area. The storage controller 400 reads data or parity of the specified FMPK 300 of the specified stripe and executes a RAID calculation to thereby recreate data (failure data) lost in the failure area and writes the recreated data in the failure FMPK (S2520). Thereafter, the storage controller 400 determines whether selection of all entries of the acquired failure address list 750 is ended (S2530). When it is determined that the selection of all the entries is ended (S2530: Yes), the storage controller 400 ends the data recovery processing. Otherwise, the storage controller 400 shifts the processing to S2510. The data recovery processing is as explained above.

With the data recovery processing, it is possible to recover data stored in a portion where a failure occurs in the failure FMPK. The FM-CTL 500 specifies a logical address area where the failure occurs and notifies the storage controller 400 of the logical address area. Therefore, the storage controller 400 can perform recovery of data concerning the specified address area. Consequently, when an address range is not specified, it is necessary to recover data in all logical address areas in the failure FMPK. Therefore, in the data recovery processing, it is possible to reduce time for data recovery.

Figure 22:
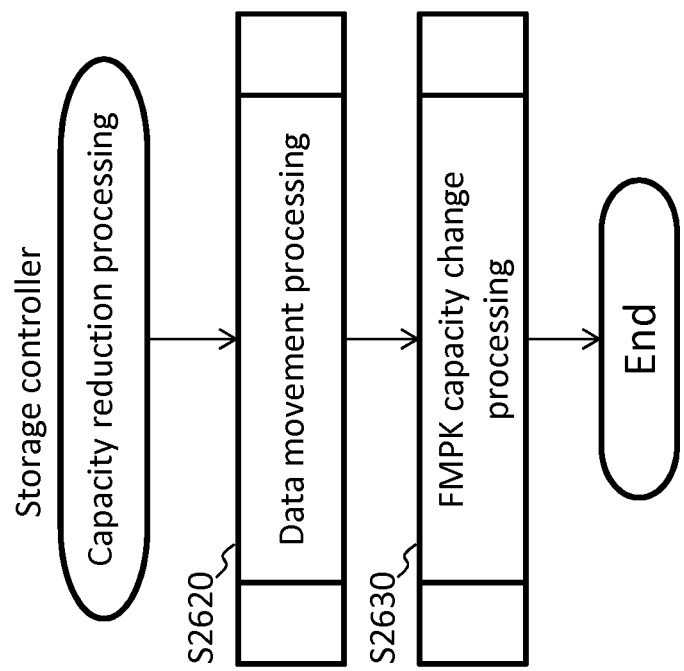
FIG. 22 shows capacity reduction processing.

FIG. 22 shows the capacity reduction processing.

In S2150, the storage controller 400 executes the capacity reduction processing.

The storage controller 400 executes data movement processing for moving data in a logical address area reduced in a failure RG (S2620), executes FMPK capacity change processing for changing the capacity of the FMPK 300 belonging to the failure RG (S2630), and ends the capacity reduction processing. The data movement processing and the FMPK capacity change processing are explained below. The capacity reduction processing is as explained above.

Figure 23:
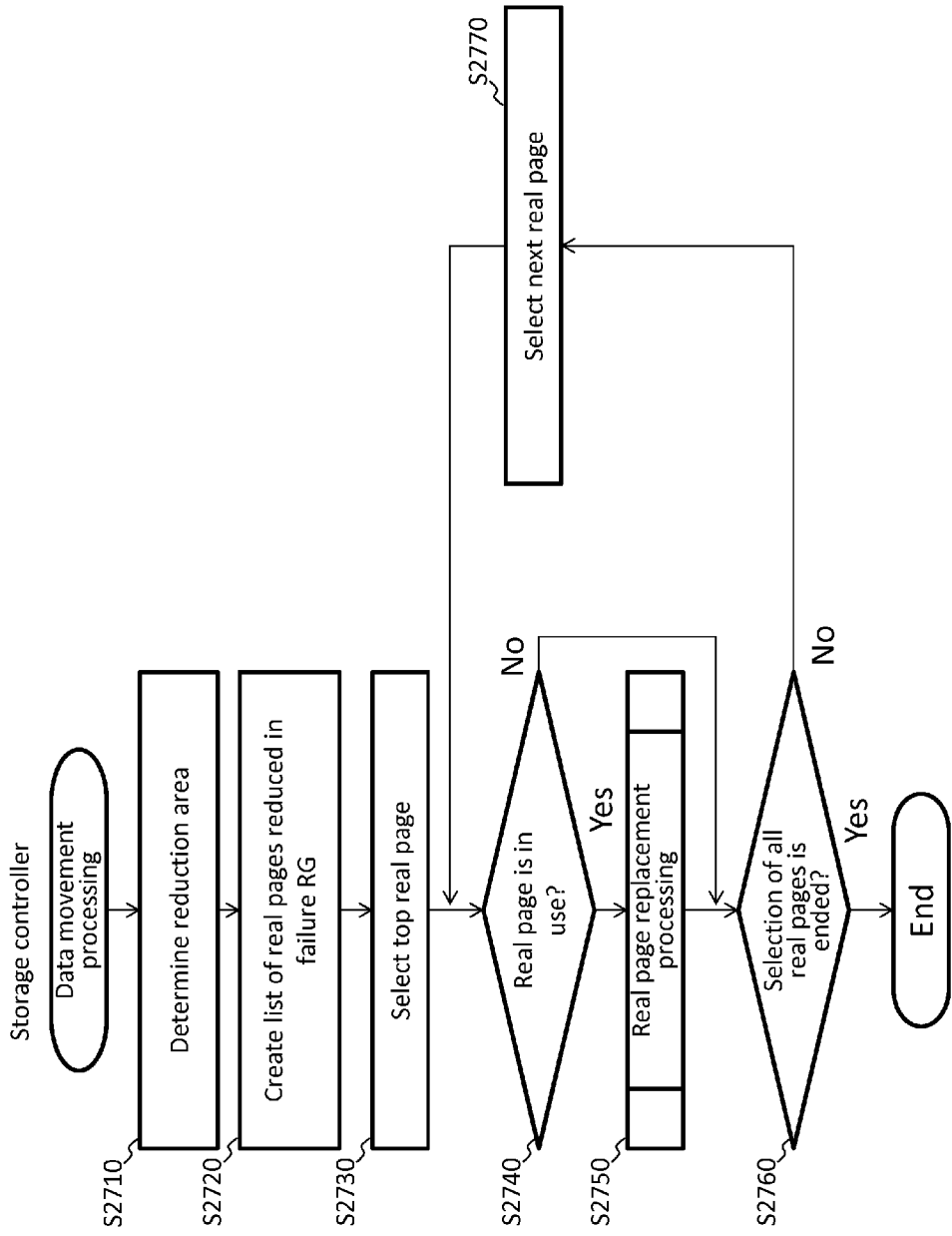
FIG. 23 shows data movement processing.

FIG. 23 shows the data movement processing.

In S2620, the storage controller 400 executes the data movement processing.

The storage controller 400 determines a reduction area, which is a logical address area to be reduced from the failure FMPK (S2710). The storage controller 400 determines a reduction size, which is the size of the reduction area, and a start address of the reduction area. The reduction area is, for example, an address range equivalent to the reduction size before the end address 645 of each of the FMPKs 300 in the PDEV management table 640. That is, reducing a capacity means that the storage controller 400 limits a usable logical address area of the FMPK 300. For example, the storage controller 400 transmits an inquiry about a normal area capacity to the failure FMPK. The FM-CTL 500 receives the inquiry about the normal area capacity, calculates, as the normal area capacity, a value obtained by multiplying the capacity of the physical storage area excluding a present defective portion (the physical capacity 742) with a user capacity ratio, and transmits the normal area capacity to the storage controller 400. The defective portion is, for example, a Bad Block. Note that, when all allocated blocks in a dies are Bad Blocks, the FMPK 300 in this embodiment closes the die with the health check processing. Therefore, even if apart of allocated blocks in a die are Bad Blocks, the FMPK 300 does not close the die. Therefore, in the FMPK 300, the capacity of all the Bad Blocks is sometimes different from the capacity of the closed portion. Accordingly, the defective portion may be the closed portion. The storage controller 400 receives the normal area capacity and calculates, as a reduction size, a value obtained by subtracting the normal area capacity from the present user capacity of the failure FMPK.

Thereafter, the storage controller 400 specifies, on the basis of the RG management table 620, the LU management table 630, and the PDEV management table 640, an RG reduction range, which is a logical address area of a stripe corresponding to the reduction area in the RG including the failure FMPK, and creates a list of all real pages in the RG reduction range (S2720). The size of the RG reduction range is different depending on the RAID level 623 of the failure RG in the RG management table 620. For example, when the RAID level 623 of the failure RG is 0, 5, or 6, the size of the RG reduction range is a value obtained by multiplying the reduction size with the number of data disks (a value obtained by subtracting the number of parity disks from the number of all disks belonging to the failure RG). When the RAID level 623 of the failure RG is 1, the size of the RG reduction range is the reduction size.

Since the storage controller 400 manages the storage area of the RG in real page units, the storage controller 400 reduces the size of the RG in real page units. The storage controller 400 determines the reduction size on the basis of information concerning the real pages rather than simply setting, as the reduction size, the size of the failure area notified from the FMPK 300. If the size of the failure area includes a fraction in real page units, the storage controller 400 calculates the reduction size obtained by rounding up the size of the failure area to an integer multiple of real page. The storage controller 400 manages the information concerning the real pages but the FMPK 300 does not manage the information concerning the real pages. Therefore, the storage controller 400 needs to notify the FMPK 300 of the reduction size with the FMPK capacity change processing explained below.

Thereafter, the storage controller 400 selects a top real page from the list of the real pages in the RG reduction range (S2730). Thereafter, the storage controller 400 determines, on the basis of the real page state management table 660, whether the real page is in use (allocated to a virtual page) (S2740). When it is determined that the real page is not in use (S2740: No), the storage controller 400 shifts the processing to S2760. This is because, if the real page is not allocated to the virtual page, it is unnecessary to copy data. When it is determined that the real page is in use (S2740: Yes), the storage controller 400 executes, with the Thin Provisioning function, real page replacement processing for setting the real page as a replacement source real page and replacing the real page with another real page (S2750). The real page replacement processing is explained below. Thereafter, the storage controller 400 determines whether selection of all the real pages of the list of the real pages is ended (S2760). When the selection of all the real pages in the RG reduction range is not ended (S2760: No), the storage controller 400 selects the next real page from the list of the real pages (S2770) and shifts the processing to S2740. When the selection of all the real pages in the RG reduction range is ended (S2760: Yes), the storage controller 400 ends the data movement processing. The data movement processing is as explained above.

Figure 24:
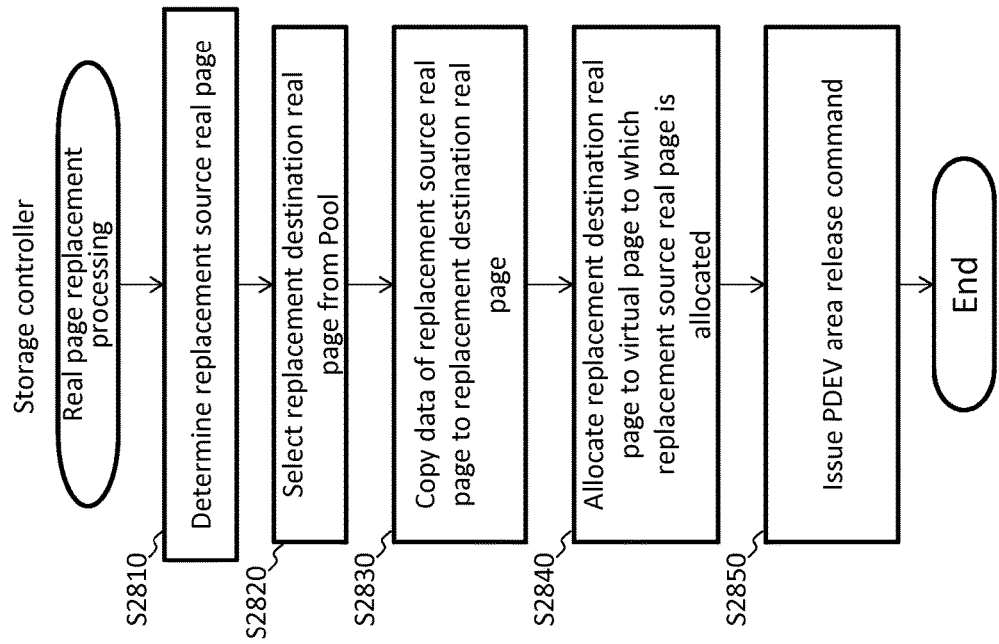
FIG. 24 shows real page replacement processing.

FIG. 24 shows the real page replacement processing.

In S2750, the storage controller 400 executes the real page replacement processing.

The storage controller 400 determines that the selected real page is a replacement source real page (S2810). Thereafter, the storage controller 400 selects, on the basis of the real page state management table 660, a replacement destination real page from a pool including unused real pages (S2820). The storage controller 400 may select a real page other than the failure RG among the real pages in the pool. Thereafter, the storage controller 400 copies data of the replacement source real page to the replacement destination real page (S2830).

Thereafter, the storage controller 400 allocates the replacement destination real page to a virtual page to which the replacement source real page is allocated (S2840). The storage controller 400 changes a replacement source real page ID to a replacement destination real page ID in the virtual page mapping management table 650 and changes the state 663 of the replacement source real page to not in use and changes the state 663 of the replacement destination real page to in use in the real page state management table 660.

Thereafter, the storage controller 400 issues, to the target FMPK, a PDEV area release command for notifying that the logical page of the target FMPK allocated to the replacement source real page is not in use (S2850) and ends the real page replacement processing. In other words, the PDEV area release command notifies that the target FMPK may discard data of the logical page. The real page replacement processing is as explained above.

Figure 25:
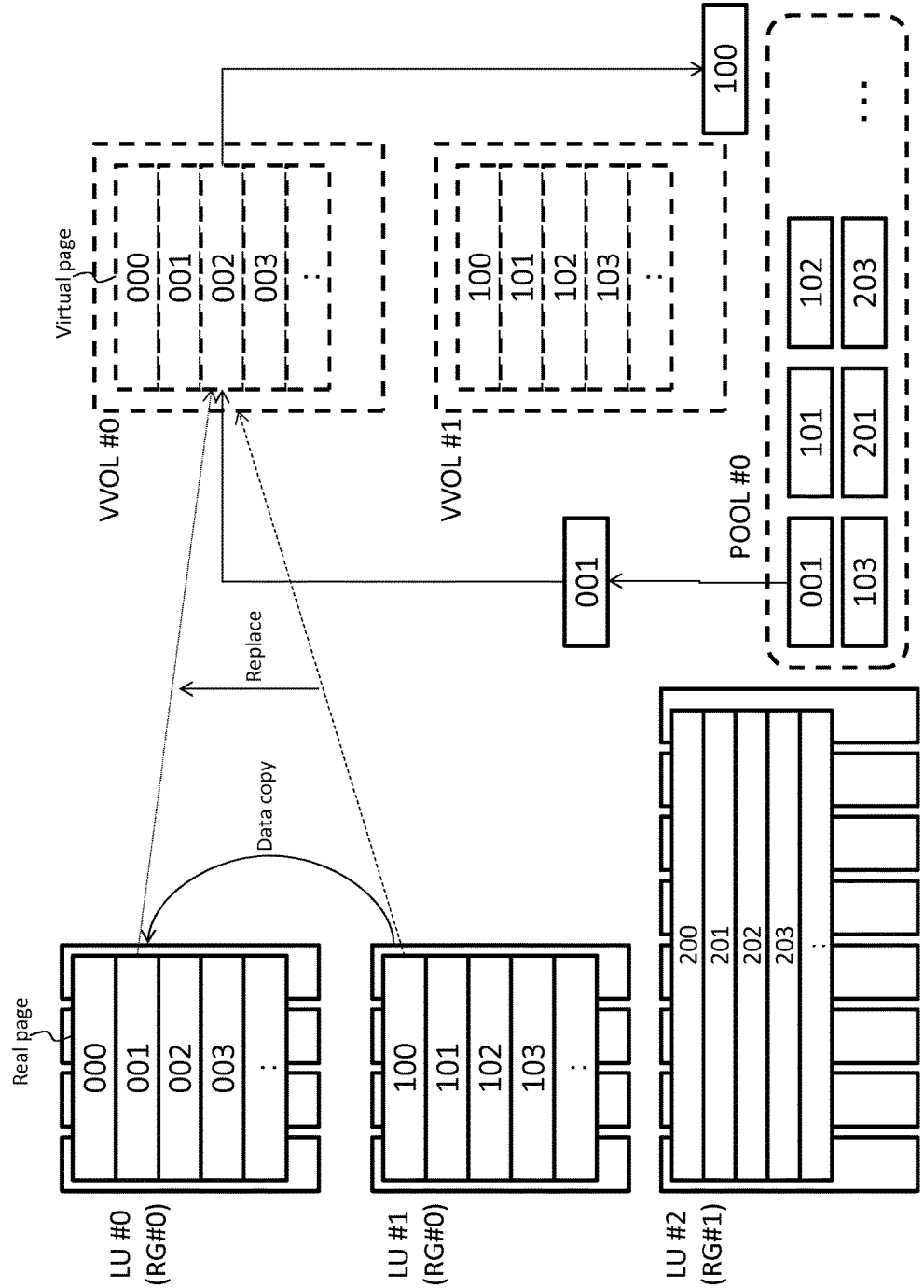
FIG. 25 schematically shows the real page replacement processing.

FIG. 25 schematically shows the real page replacement processing.

In the real page replacement processing shown in the figure, a real page #100 is selected as a replacement source real page. The replacement source real page is allocated to a virtual page #002. Thereafter, the real page #001 is selected from a pool #0 as a replacement destination real page. The replacement destination real page is allocated to the virtual page #002.

With the real page replacement processing, it is possible to allocate a real page from a pool to a virtual page to which a real page to be reduced in the failure RG is allocated. Consequently, it is possible to change all real pages to be reduced in the failure RG to an unused state and reduce the capacity of the failure RG.

With the data movement processing, it is possible to determine a reduction area on the basis of the present user capacity and the capacity of the physical storage area where the failure occurs in the failure FMPK. The data stored in the real page corresponding to the reduction area of the failure FMPK is moved. A real page at a movement destination is allocated to the virtual page to which the real page is allocated. Consequently, it is possible to maintain access from the host computer 200 to an address included in the virtual page.

Figure 26:
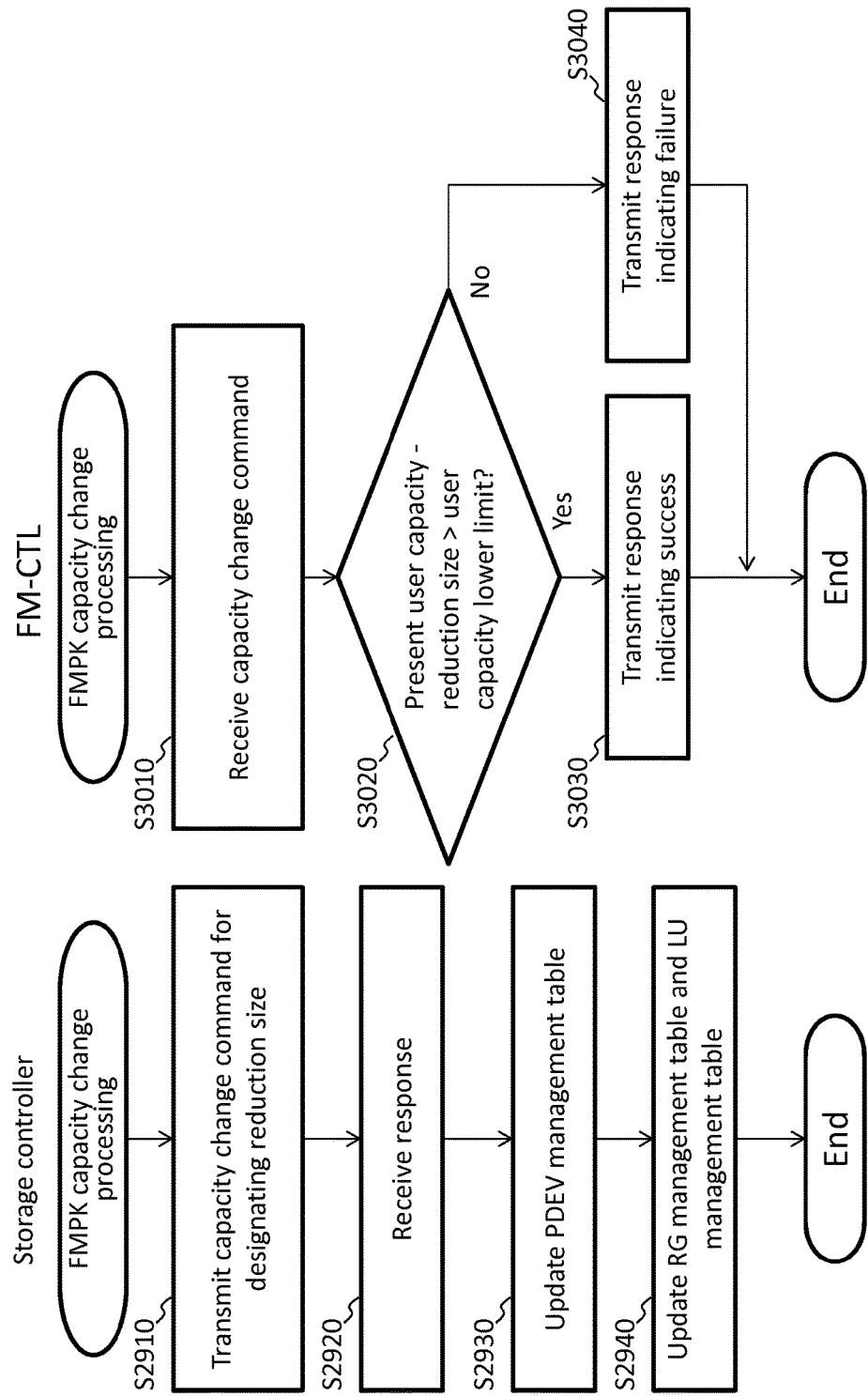
FIG. 26 shows FMPK capacity change processing.

FIG. 26 shows the FMPK capacity change processing.

In S2630, the storage controller 400 sets each of all the FMPKs 300 belonging to the failure RG as the target FMPK and executes the FMPK capacity change processing.

The storage controller 400 transmits a capacity change command designating a reduction size to the target FMPK (S2910) and receives a response to the capacity change command (S2920). Thereafter, the storage controller 400 updates an entry of the target FMPK in the PDEV management table 640 (S2930). The storage controller 400 changes the present user capacity 642 of the target FMPK to a value obtained by subtracting the reduction size from a stored value. Further, the storage controller 400 changes the end address 645 to a value obtained by subtracting the reduction size from a stored value.

Thereafter, the storage controller 400 updates the RG management table 620 and the LU management table 630 (S2940) and ends the FMPK capacity change processing. The storage controller 400 updates the PDEV minimum capacity 625 of the RG management table 620 and the LU size 635 of the LU management table 630 on the basis of the updated present user capacity 642. Consequently, the replacement source real page returned to the pool in the page replacement processing is deleted from the pool.

Upon receiving a capacity change command from the storage controller 400 (S3010), the FM-CTL 500 calculates, from the present user capacity 743 in the memory 520, a value obtained by subtracting a reduction size designated by the capacity change command as a user capacity after reduction and determines whether the user capacity after reduction is larger than the user capacity lower limit 745 in the memory 520 (S3020). When it is determined that the user capacity after reduction is larger than the user capacity lower limit 745 (S3020: Yes), the FM-CTL 500 changes a value of the present user capacity 743 to the user capacity after reduction, transmits a response indicating success concerning the capacity change command to the storage controller 400 (S3030), and ends the FMPK capacity change processing. Otherwise (S3020: No), the FM-CTL 500 transmits a response indicating failure concerning the capacity change command to the storage controller 400 (S3030) and ends the FMPK capacity change processing. When the storage controller 400 receives a response indicating failure from the FMPK 300, the storage controller 400 closes the entire FMPK 300. That is, when the user capacity of the FMPK 300 is reduced to be equal to or smaller than the user capacity lower limit 745 by the FMPK capacity change processing, the FMPK 300 is closed. The FMPK capacity change processing is as explained above.

In general, when the host computer 200 changes the capacity of a volume at an access destination, the host computer 200 needs to stop a job and recognize the volume again. In this embodiment, when the capacity of the FMPK is reduced, the capacity of the pool is reduced. More specifically, the number of the real pages included in the pool is reduced. A storage area is allocated to a virtual volume from the pool. However, the capacity of the virtual volume is not changed. Consequently, the host computer 200 does not need to recognize capacity reduction due to a partial failure inside the FMPK and can maintain access to the virtual volume.

In the following explanation and the drawings, the FMPKs 300 other than the failure FMPK belonging to the failure RG are sometimes referred to as related FMPKs. A logical address area of the related FMPK corresponding to a stripe of the reduction area of the failure FMPK in the failure RG is sometimes referred to as related area. With the FMPK capacity change processing, it is possible not only to reduce the reduction area of the failure FMPK but also to reduce the related area of the related FMPK.

With the FMPK capacity change processing, it is possible to reflect the present user area reduced by the storage controller 400 on the FMPK 300.

Figure 27:
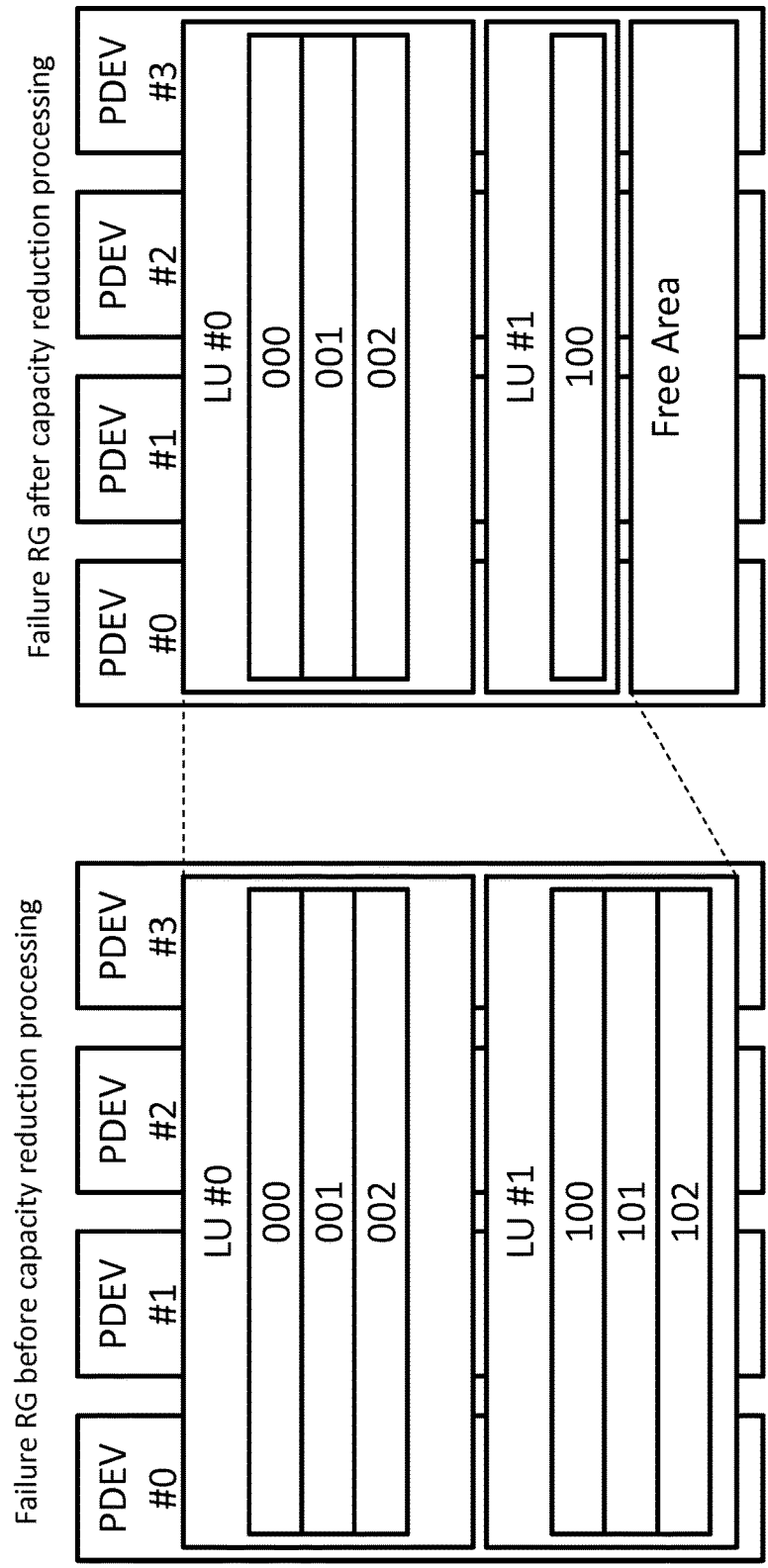
FIG. 27 schematically shows the capacity reduction processing.

FIG. 27 schematically shows the capacity reduction processing.

The figure shows an arrangement of real pages in the failure RG before the capacity reduction processing and an arrangement of real pages in the RG after the capacity reduction processing. In the FMPK 300 belonging to the failure RG, data of the real page in an address range after a reduced user capacity is moved to another real page by the capacity reduction processing. Consequently, in all the FMPKs 300 belonging to the failure RG, an address range from the top to the present user capacity is allocated to the failure RG. In all the FMPKs 300 belonging to the failure RG, an address range after the present user capacity is an unused area (a Free Area) not used in the failure RG.

With the capacity reduction processing, the storage controller 400 can reduce the present user capacity of the failure FMPK by moving the data of the real page corresponding to the reduction area of the failure FMPK and allocating the real page in the pool to the virtual page allocated to the real page. The storage controller 400 can adjust the present user capacity of the FMPK 300 belonging to the failure RG and reduce the capacity of the failure RG by reducing the reduction areas and the related areas. The FM-CTL 500 can reduce the present user capacity according to an instruction from the storage controller 400.

According to this embodiment, when a failure occurs in the FMPK 300, by reducing the capacity of the FMPK 300 according to a failure portion, the storage controller 400 can prevent the entire FMPK 300 from being closed and continue the use of the FMPK 300. The storage controller 400 can close, in DMA, chip, die, or plane units inside the FMPK 300, the portion where the failure occurs. When a failure occurs in one of the plurality of FMPKs 300 belonging to an RG, the storage controller 400 can continue the use of the RG by reducing the capacity of the RG.

Second Embodiment

In the first embodiment, when the user capacity of the failure FMPK is reduced, the user capacity is also reduced for the other FMPKs 300 belonging to the same RG as the failure FMPK in the same manner as in the failure FMPK. Therefore, even a logical address area without a failure is unusable as an RG. In this embodiment, such a storage area of the FMPK 300 where a failure does not occur is effectively utilized. The storage system 100 in this embodiment registers, in a pool, a related area reduced by the capacity reduction processing in a certain RG and allocates the related area to a reduction area during occurrence of a failure in another RG. In this embodiment, differences from the first embodiment are mainly explained. Explanation is omitted concerning similarities to the first embodiment.

Figure 28:
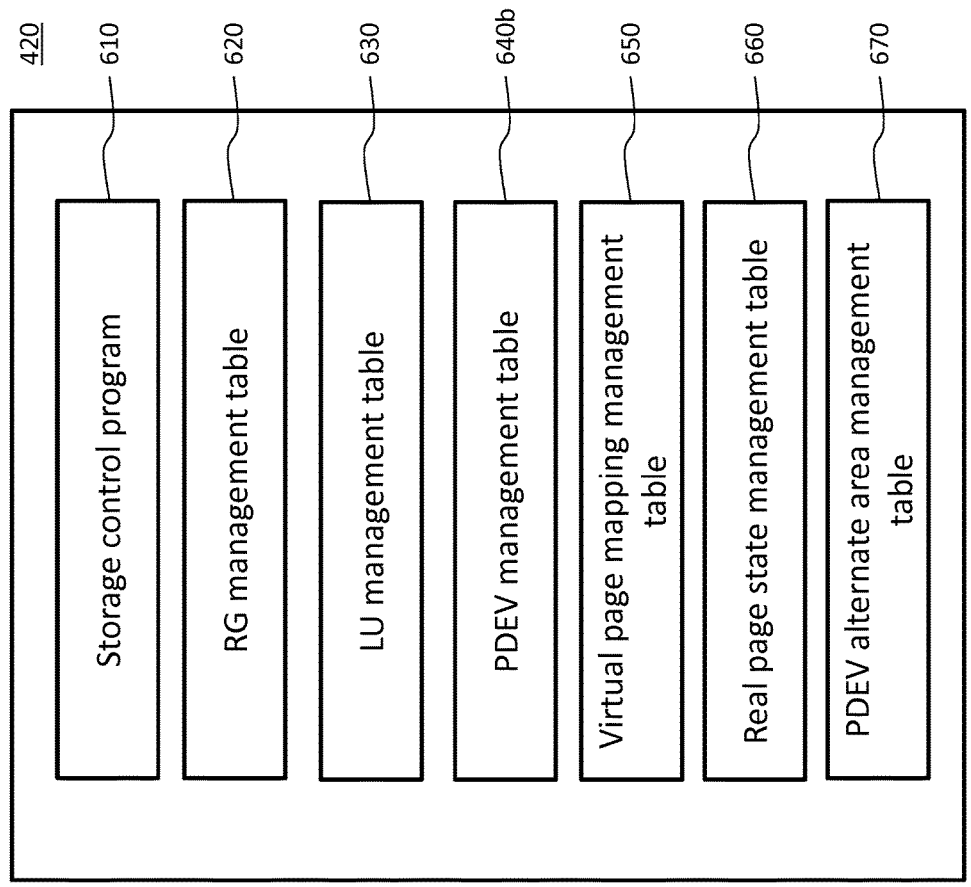
FIG. 28 shows information stored in the memory 420 of the storage controller 400 in a second embodiment.

FIG. 28 shows information stored in the memory 420 of the storage controller 400 in the second embodiment.

Compared with the memory 420 in the first embodiment, the memory 420 in the second embodiment further stores a PDEV management table 640*b* instead of the PDEV management table 640 and stores a PDEV alternate area management table 670 anew.

FIG. 29 shows the PDEV management table 640*b* in the second embodiment.

Compared with the PDEV management table 640 in the first embodiment, an entry of a PDEV in the PDEV management table 640*b* in the second embodiment further includes an alternate area flag (alternate area presence or absence) 646 indicating whether the PDEV includes an alternate area. The alternate area in this embodiment is a related area reduced by the capacity reduction processing. In other words, the alternate area is an area without a failure in an unused area created by the capacity reduction processing.

FIG. 30 shows the PDEV alternate area management table 670.

The PDEV alternate area management tale 670 includes an entry for each of alternate areas. An entry of a certain alternate area includes an alternate area ID 671 indicating the alternate area, a state 672 of the alternate area, a PDEV number (PDEV#) 673 indicating a PDEV including the alternate area, a start address 674 of the alternate area in a logical address space in an RG to which the alternate area belongs, an end address 675 of the alternate area, an alternate source alternate area ID 676 indicating an alternate area at an alternate source when the alternate area is an alternate destination, and an alternate destination alternate area ID 677 indicating an alternate area at an alternate destination when the alternate area is an alternate source. The state 672 indicates any one of an alternate source, an alternate destination, and not in use. The storage controller 400 manages, as a PDEV alternate area pool, a set of unused alternate areas registered in the PDEV alternate area management table 670.

Figure 31:
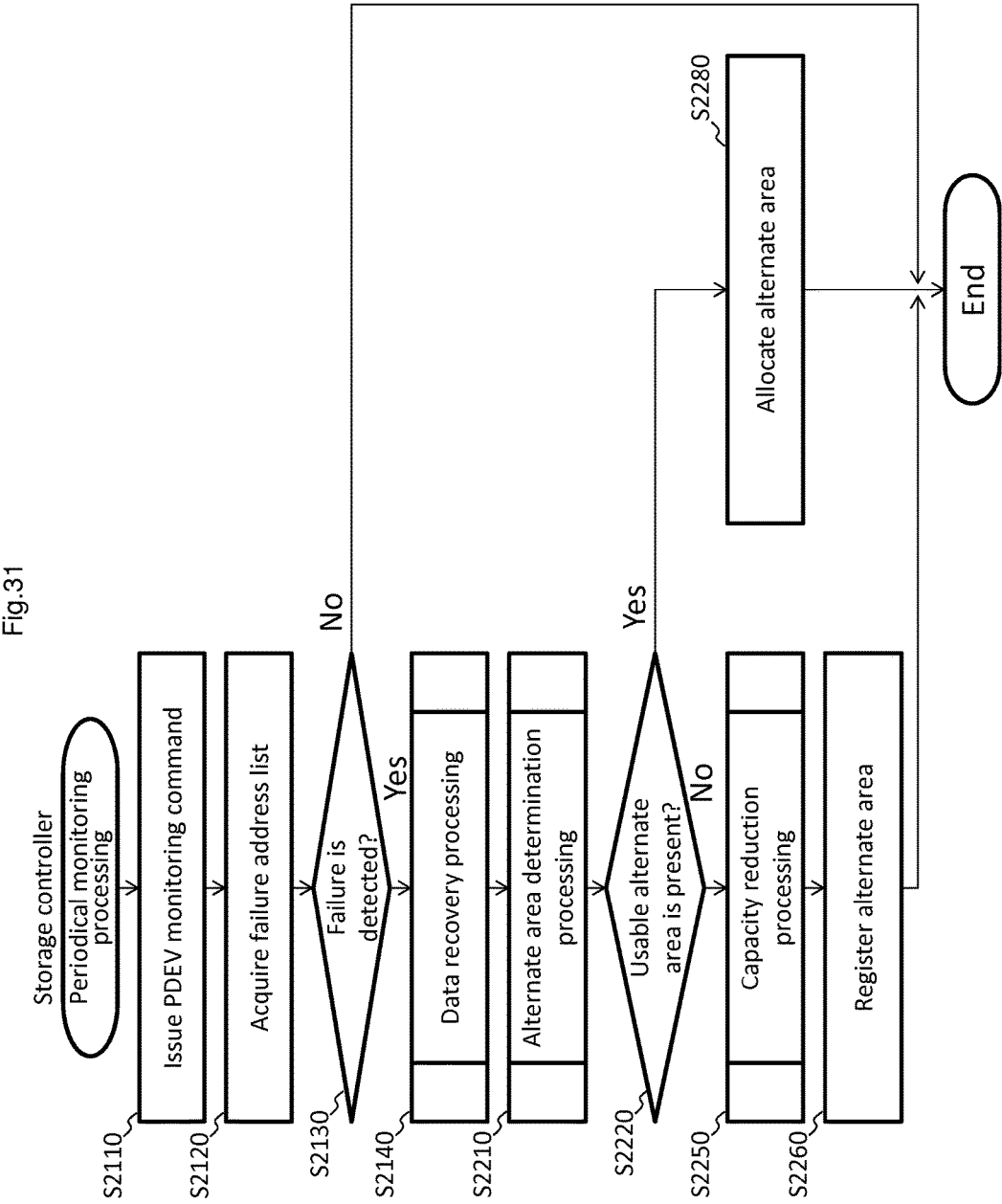
FIG. 31 shows periodical monitoring processing in the second embodiment.

FIG. 31 indicates periodical monitoring processing in the second embodiment.

S2110, S2120, S2130, and S2140 in the periodical monitoring processing in the second embodiment are the same as the steps in the periodical monitoring processing in the first embodiment. After S2140, the storage controller 400 executes alternate area determination processing for detecting a usable alternate area, which is an alternate area replaceable with a reduction area of a failure FMPK (S2210) and determines whether a usable alternate area is present (S2220). The alternate area determination processing is explained below.

When it is determined that a usable alternate area is absent (S2220: No), the storage controller 400 executes capacity reduction processing same as the capacity reduction processing in S2150 (S2250). Thereafter, the storage controller 400 adds, in the PDEV alternate area management table 670, an entry of a related area reduced by the capacity reduction processing to thereby register the related area in a PDEV alternate area pool as an alternate area (S2260) and ends the periodical monitoring processing. The storage controller 400 inputs "not in use" to the state 672 of the added entry.

When it is determined that a usable alternate area is present (S2210: Yes), the storage controller 400 allocates the usable alternate area to the reduction area of the failure FMPK in the failure RG (S2280) and ends the periodical monitoring processing. The storage controller 400 replaces the reduction area of the failure FMPK with the usable alternate area in the failure RG to thereby continue use of the failure RG without reducing the capacity of the failure RG. The periodical monitoring processing in the second embodiment is as explained above.

Figure 32:
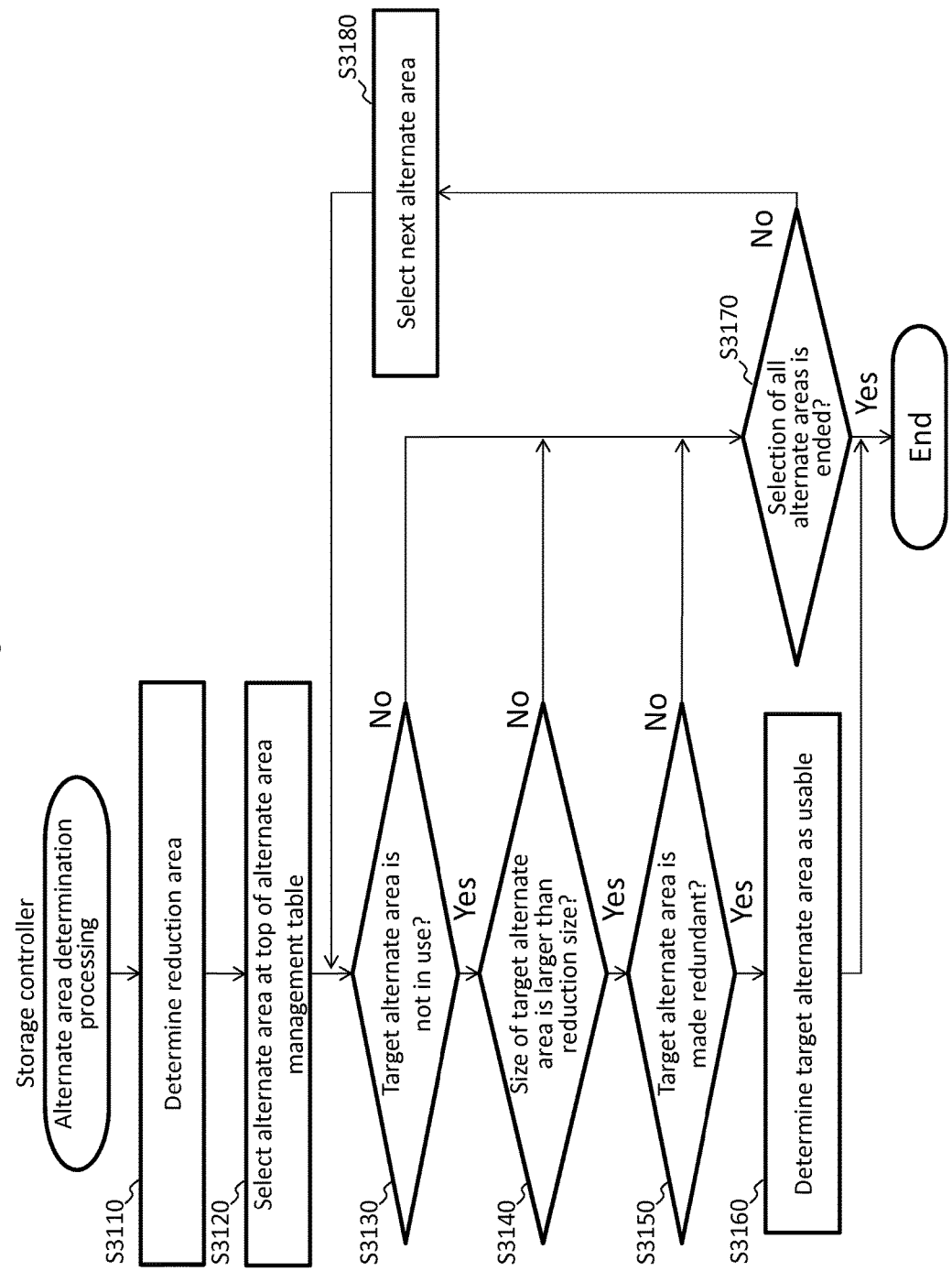
FIG. 32 shows alternate area determination processing.

FIG. 32 shows the alternate area determination processing.

In S2280, the storage controller 400 executes the alternate area determination processing.

As in S2710 in the first embodiment, the storage controller 400 determines a reduction area of the failure FMPK (S3110). Thereafter, the storage controller 400 selects, as a target alternate area, an alternate area of atop entry of the PDEV alternate area management table 670 (S3120). Thereafter, the storage controller 400 determines, on the basis of the state 672 of the target alternate area, whether the target alternate area is not in use (S3130). When it is determined that the target alternate area is not not in use (S3130: No), the storage controller 400 shifts the processing to S3170.

When it is determined that the target alternate area is not in use (S3130: Yes), the storage controller 400 determines whether the size of the target alternate area is equal to or larger than the size of the reduction area of the failure FMPK (a reduction size) (S3140). When it is determined that the size of the target alternate area is not equal to or larger than the reduction size (S3140: No), the storage controller 400 shifts the processing to S3170.

When it is determined that the size of the target alternate area is equal to or larger than the reduction size (S3140: Yes), the storage controller 400 determines whether the target alternate area is made redundant when the reduction area is replaced with the target alternate area (S3150). The storage controller 400 recognizes other FMPKs 300 including storage areas corresponding to a stripe of the reduction area in the failure RG and, when recognized all the FMPKs 300 are different from the FMPK 300 including the target alternate area, determines that the target alternate area is made redundant. That is, the storage controller 400 uses the alternate area of the failure RG in an RG different from the failure RG to which the alternate area belongs. This is because, if the alternate area in the failure RG is used in an RG same as the failure RG, redundancy is deteriorated and data restoration is impossible during a failure of an FMPK. When it is determined that the target alternate area is not made redundant (S3150: No), the storage controller 400 shifts the processing to S3170.

When it is determined that the target alternate area is made redundant (S3150: Yes), the storage controller 400 determines that the target alternate area is usable as an alternate destination of the reduction area and sets the target alternate area as a usable alternate area (S3160). In the PDEV alternate area management table 670, the storage controller 400 adds an entry of the reduction area of the failure FMPK, inputs "alternate source" to the state 672, and inputs an ID of the usable alternate area to the alternate destination alternate area ID 677. Further, in the PDEV alternate area management table 670, the storage controller 400 changes a value of the state 672 of the usable alternate area to "alternate destination" and inputs an ID of the reduction area of the failure FMPK to the alternate source alternate area ID 676.

Thereafter, the storage controller 400 determines whether the selection of alternate areas of all the entries in the PDEV alternate area management table 670 is ended (S3170). When it is determined that the selection of all the entries is not ended (S3170: No), the storage controller 400 selects an alternate area of the next entry in the PDEV alternate area management table 670 as a target alternate area (S3180) and shifts the processing to S3120. When it is determined that the selection of all the entries is ended (S3170: Yes), the storage controller 400 ends the alternate area determination processing. The alternate area determination processing is as explained above. With the processing explained above, it is possible to use the related area as the alternate area without deteriorating redundancy.

Figure 33:
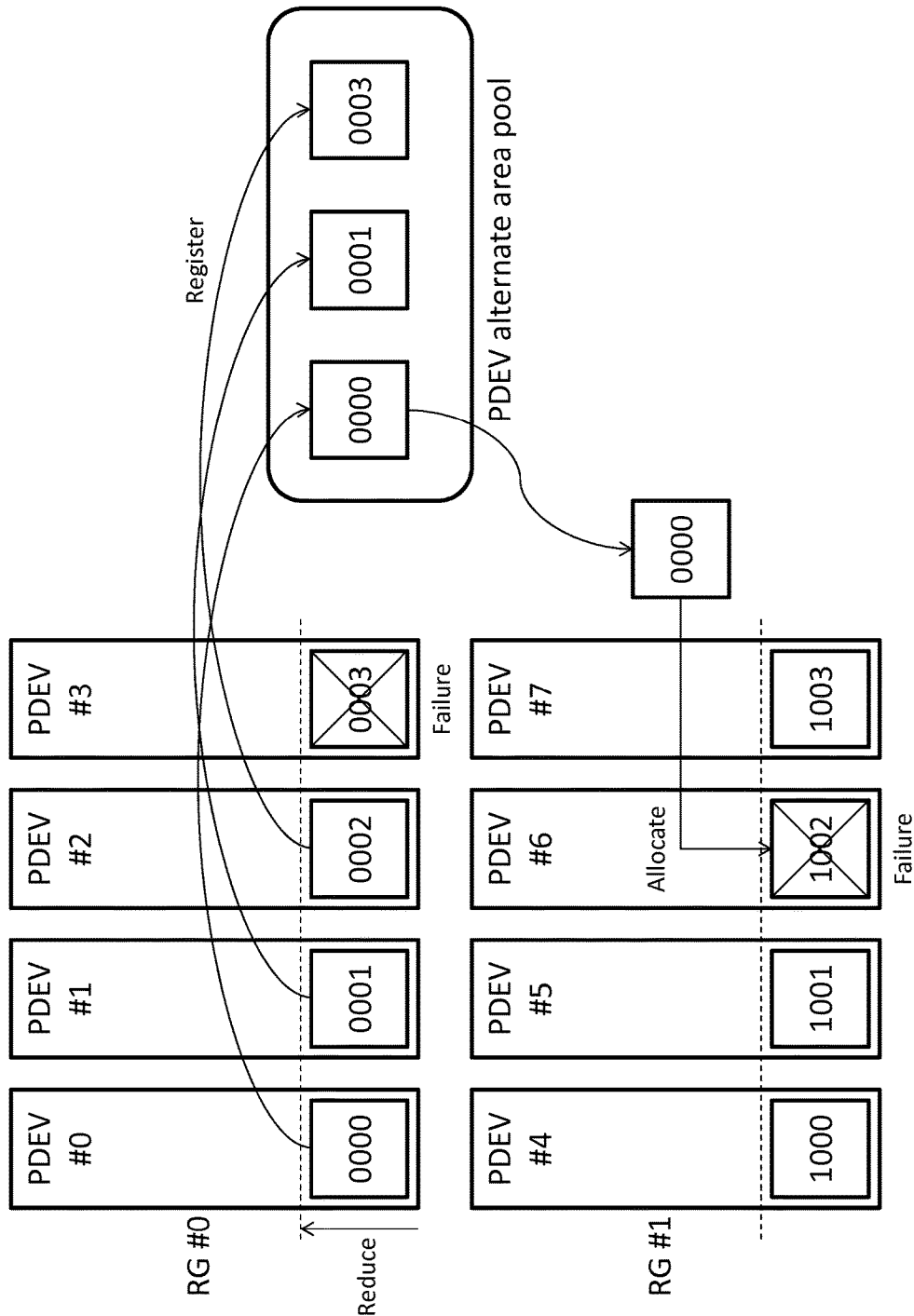
FIG. 33 schematically shows registration and allocation of an alternate area in the second embodiment.

FIG. 33 schematically shows registration and allocation of the alternate area in the second embodiment.

In the example shown in the figure, the storage controller 400 builds an RG #0 using PDEVs #0, #1, #2, and #3, which are the FMPKs 300, and builds an RG #1 using PDEVs #4, #5, #6, and #7, which are the FMPKs 300.

When a partial failure occurs in a physical storage area on the inside of the PDEV #3, the storage controller 400 sets a logical address area #0003, which is an area in an FMPK logical address space, as a reduction area and reduces a user capacity of the PDEV #3 by the size of the reduction area. The logical address area includes several logical pages. Therefore, concerning the PDEVs #0, #1, and #2 belonging to the same RG #0 as the PDEV #3, the storage controller 400 sets, as reduction areas, logical address areas #0000, #0001, and #0002 corresponding to a stripe of the logical address area #0003, reduces user capacities of the PDEVs #0, #1, and #2 by the size of the reduction area, and reduces the capacity of the RG #0. Further, the storage controller 400 registers the logical address areas #0000, #0001, and #0002 in the PDEV alternate area pool as alternate areas.

Thereafter, when a failure occurs in the logical address area #1002 of the PDEV #6, the storage controller 400 selects the alternate area #0000 from the PDEV alternate area pool and uses the alternate area #0000 instead of the logical address area #1002. Consequently, it is possible to continue the use of the RG #1 without reducing the capacity of the RG #1. That is, the storage controller 400 can create one or more real pages on the basis of the logical address areas #1000, #1001, #0000, and#1003. The logical address area#0000 physically belongs to an RG different from the RG #1. However, it is possible to use the logical address area #0000 by associating the logical address area #0000 with a real page, which is a logical storage area.

According to this embodiment, when the capacity of the failure RG is reduced, the storage controller 400 can register a reduction area other than the failure FMPK in the failure RG as an alternate area. Thereafter, when a failure occurs in another RG, the storage controller 400 can use the alternate area instead of a logical address area in an FMPK where the failure occurs and can maintain the capacity of the RG. The storage controller 400 can maintain the redundancy of the failure RG by selecting the alternate area to be made redundant.

Third Embodiment

The storage system 100 in this embodiment registers an unused area prepared in advance in a pool and allocates the unused area to a reduction area of a failure FMPK. In this embodiment, differences from the second embodiment are mainly explained. Explanation is omitted concerning similarities to the second embodiment.

In the storage system 100 in the third embodiment, the storage controller 400 includes at least one spare PDEV besides the plurality of FMPKs 300. The storage controller 400 sets a logical address area in the spare PDEV as an alternate area and creates an entry of the alternate area in the PDEV alternate area management table 670 to thereby register the alternate area in a PDEV alternate area pool.

Periodical monitoring processing in the third embodiment is the same as the periodical monitoring processing in the second embodiment. Note that, in S2260, the storage controller 400 does not have to register a reduction area other than the failure FMPK created by the capacity reduction processing. In this case, only the alternate area in the spare PDEV is registered in the PDEV alternate area pool.

FIG. 34 schematically shows allocation of an alternate area in the third embodiment.

In an example shown in the figure, the storage controller 400 builds an RG #0 using PDEVs #0, #1, #2, and #3, which are the FMPKs 300 and builds an RG #1 using PDEVs #4, #5, #6, and #7, which are the FMPKs 300. Further, the storage controller 400 sets a PDEV #100, which is the FMPK 300, as a spare PDEV and registers an alternate area in the spare PDEV in the PDEV alternate area pool.

When a failure occurs in a logical address area #0003 of the PDEV #3, the storage controller 400 selects an alternate area #9100 from the PDEV alternate area pool and uses the alternate area #9100 instead of the logical address area #0003. Consequently, it is possible to continue the use of the RG #0 without reducing the capacity of the RG #0.

Similarly, when a failure occurs in a logical address area #1002 of the PDEV #6, the storage controller 400 selects, with alternate area allocation processing, an alternate area #9200 from the PDEV alternate area pool and uses the alternate area #9200 instead of the logical address area #1002. Consequently, it is possible to continue the use of the RG #0 without reducing the capacity of the RG #1.

According to this embodiment, when a failure occurs in the FMPK 300, the storage controller 400 can maintain the capacity of an RG of the reduction area, by using an alternate area prepared in advance instead of the reduction area.

Fourth Embodiment

In the first embodiment, when the user capacity of the failure FMPK is reduced, concerning the other FMPKs 300 belonging to the same RG as the failure FMPK, the user capacity is reduced as in the failure FMPK. Therefore, even a storage area of the FMPK 300 where a failure does not occur is unusable as an RG. In this embodiment, such a storage area of the FMPK 300 where a failure does not occur is effectively utilized. Concerning a related area reduced by capacity reduction processing in a certain RG, the storage system 100 in this embodiment changes and uses a RAID configuration. In this embodiment, differences from the first embodiment are mainly explained. Explanation is omitted concerning similarities to the first embodiment.

FIG. 35 schematically shows a change in a RAID configuration in the fourth embodiment.

In an example shown in the figure, the storage controller 400 builds an RG #0 using PDEVs #0, #1, #2, and #3, which are the FMPKs 300. It is assumed that, before a failure occurs, the RG #0 has a RAID configuration of 3D+1P. When a failure occurs in apart of a physical storage area of the PDEV #0, the storage controller 400 reduces a user capacity usable by the PDEV #0 in which the failure occurs and does not change a user capacity usable by the PDEVs #1, #2, and #3 in which a failure does not occur.

The storage controller 400 continuously controls areas, the capacities of which are not reduced, as the RG #0 of 3D+1P. The storage controller 400 changes the related area in a RAID configuration thereof and controls the related area as an RG #1 of 2D+1P. The storage controller 400 divides a storage area of the RG #1 into real pages and manages the real pages. The storage controller 400 allocates the real pages in response to a write request in a virtual volume received from the host computer 200. When data is moved from an area of 3D+1P to an area of 2D+1P, the storage controller 400 recreates parity according to 2D+1P.

In the example explained above, the RAID configuration is changed from 3D+1P to 2D+1P. However, other RAID configurations may be adopted. For example, related areas of the PDEV #1 and the PDEV #2 may be controlled as RAID 1 (mirroring) or a related area of the PDEV #3 may be registered in the PDEV alternate area pool as a spare area. For example, when failures occur in two of PDEVs included in a RAID group of 14D+2P, related areas may be controlled as three RAID groups of 3D+1P and related areas of the residual two PDEVs may be set as spare areas.

According to this embodiment, when a failure occurs in the FMPK 300, the storage controller 400 can continuously use the FMPK 300 by changing a RAID configuration concerning a related area. Therefore, it is possible to use the capacity of the related area without any waste.

Terms are explained. The usable capacity corresponds to the present user capacity and the like. The page in the logical storage area corresponds to the real page and the like. The virtual storage area corresponds to the virtual page and the like. The failure information corresponds to the failure address list and the like. The first storage device and the second storage device correspond to the failure FMPK and the like. The alternate area information corresponds to the PDEV alternate area management table 670 and the like. The instruction corresponds to the capacity change command and the like. The minimum usable capacity corresponds to the PDEV minimum capacity and the like. The logical address range corresponds to the logical address area and the like.

Note that, in the above explanation, the information of the present invention is explained by the expressions such as "aaa table", "aaa list", "aaa DB", and "aaa queue". However, these kinds of information may be represented by expressions other than data structures such as a table, a list, a DB, and a queue. Therefore, to indicate that the information does not depend on the data structures, "aaa table", "aaa list", "aaa DB", "aaa queue", and the like are sometimes referred to as "aaa information".

Further, when contents of the respective kinds of information are explained, expressions such as "identification information", "identifier", "appellation", "name", and "ID" are used. However, these expressions are interchangeable with one another.

In the above explanation, "program" is sometimes a subject. However, the program is executed by a processor to perform set processing using a memory and a communication port. Therefore, in the explanation, the processor may be a subject. The processing disclosed as being performed by the program may be processing performed by a management computer or an information processing apparatus. Apart or all of the program may be realized by dedicated hardware.

The various programs may be installed in computers by a program distribution server or computer-readable storage media.

The nonvolatile semiconductor memory in the embodiments is an FM (Flash Memory). The FM in the embodiments is an FM of a type in which erasing is performed in block units and read and write are performed in page units, typically, a NAND type flash memory. However, the FM may be flash memories of other types (e.g., an NOR type) instead of the NAND type. Instead of the FM, nonvolatile semiconductor memories of other types, for example, semiconductor memories such as an MRAM (Magnetoresistive random access memory), which is a magnetoresistive memory, a ReRAM (Resistance random access memory), which is a variable resistance type memory, and a FeRAM (Ferroelectric random access memory), which is a ferroelectric memory, and a phase change memory may be used.

REFERENCE SIGNS LIST

100 Storage system
200 Host computer
300 FMPK
310 Memory module
400 Storage controller
410 CPU
420 Memory
500 FM-CTL
510 CPU
520 Memory
541 DMA controller
570 FM chip
571 Die
572 Block

The invention claimed is:

1. A storage apparatus comprising:
a plurality of storage devices; and
a storage controller coupled to the plurality of storage devices and a host computer and configured to provide the host computer with a virtual volume, wherein
each of the plurality of storage devices includes: a plurality of nonvolatile semiconductor memories; and a device controller configured to manage a failure that occurs partially in the plurality of nonvolatile semiconductor memories and provide the storage controller with a logical address space associated with some of the plurality of nonvolatile semiconductor memories,
the storage controller is configured to store a logical address space for each of the plurality of storage devices, configure a first RAID group using a first storage device group among the plurality of storage devices, divide a logical storage area in the first RAID group into a plurality of pages, and allocate, on the basis of a write request from the host computer to the virtual volume, one of the plurality of pages in the first RAID group to the virtual volume, the device controller is configured to detect a partial failure in the plurality of nonvolatile semiconductor memories and transmit failure information indicating the detected failure to the storage controller, and the storage controller is configured to determine, when receiving first failure information indicating a failure in a first storage device in the first storage device group from the first storage device, a first reduction area, which is a logical address range reduced from a logical address space in the first storage device on the basis of the first failure information, specify a first logical storage area corresponding to the first reduction area in the first RAID group, specify a specific virtual storage area in which the first logical storage area is allocated from the virtual volume, select a second logical storage area that is not allocated to the virtual volume from among a plurality of logical storage areas in which some of the plurality of storage devices are allocated, move data stored in the first logical storage area from the first logical storage area to the second logical storage area, allocate the second logical storage area to the specific virtual storage area, and reduce, from a logical address space of each storage device among the storage devices in the first storage device group used to configure the first RAID group, a logical address range corresponding to the first reduction area which is the logical address range reduced from the logical address space in the first storage device of the first storage device group on the basis of the first failure information.

2. A storage apparatus according to claim 1, wherein the storage controller is configured to specify failure data, which is data lost by the failure in the first storage device, on the basis of the first failure information, and recover the failure data on the basis of data stored in a storage device other than the first storage device in the first storage device group.

3. A storage apparatus according to claim 2, wherein the storage controller is configured to store alternate area information indicating an alternate area, which is a logical address range not used by a RAID group among each logical address space of the plurality of storage devices, make it a condition that a size of the alternate area is greater than or equal to a size of the first reduction area and the alternate area is provided from the storage device in the storage device group other than the first storage device group among the plurality of storage devices, determine whether the alternate area to meet the condition is shown in the alternate area information or not, and when determining that the alternate area to meet the condition is shown in the alternate area information, use the alternate area instead of the first reduction area.

4. A storage apparatus according to claim 3, wherein the device controller of the first storage device is configured to close a portion where the failure occurs in the first storage device.

5. A storage apparatus according to claim 4, wherein the device controller is configured to store a user capacities, which is a size of a logical address space to be provided from the plurality of nonvolatile semiconductor memories to the storage controller and transmit the stored user capacities to the storage controller, and the storage controller is configured to receive the transmitted user capacities and store the received user capacities.

6. A storage apparatus according to claim 5, wherein the storage controller is configured to transmit, to the first storage device, an instruction for reducing a size of the first reduction area from the user capacity of the first storage device when receiving the first failure information, and a device controller of the first storage device is configured to reduce, according to the instruction, a size of the first reduction area from a user capacity of the first storage device.

7. A storage apparatus according to claim 6, wherein the storage controller is configured to detect a minimum usable capacity, which is a minimum value of user capacities of storage devices in the first storage device group, and create the first RAID group using minimum usable capacities of each storage device in the first storage device group.

8. A storage apparatus according to claim 3, wherein the storage controller is configured to create a second RAID group using a second storage device group among the plurality of storage devices, and the storage controller is configured to determine, when receiving second failure information indicating a failure in a second storage device in the second storage device group from the second storage device, a second reduction area, which is a logical address range reduced from a logical address space of the second storage device, on the basis of the second failure information, specify a related area, which is a logical address range corresponding to the second reduction area in a logical address space of a storage device other than the second storage device in the second storage device group, and register the related area in the alternate area information as the alternate area.

9. A storage apparatus according to claim 3, wherein the storage controller is configured to register, in the alternate area information, a logical address range in an alternate storage device in the plurality of storage devices as the alternate area.

10. A storage apparatus control method comprising:

storing, using a storage controller, that provides a host computer with a virtual volume, a logical address space associated with some of the plurality of nonvolatile semiconductor memories in each of a plurality of storage devices and provided to the storage controller, configuring, using the storage controller, a first RAID group using a first storage device group among the plurality of storage devices, dividing, using the storage controller, a logical storage area in the first RAID group into a plurality of pages, and allocating, using the storage controller, on the basis of a write request from the host computer to the virtual volume, one of the plurality of pages in the first RAID group to the virtual volume;

detecting, using a device controller in each of the plurality of storage devices, a partial failure in the plurality of nonvolatile semiconductor memories and transmitting, using the device controller, failure information indicating the detected failure to the storage controller; and when the storage controller receives first failure information indicating a failure in a first storage device in the first storage device group from the first storage device, determining, using the storage controller, a first reduction area, which is a logical address range reduced from the logical address space in the first storage device on the basis of the first failure information, specifying, using the storage controller, a first logical storage area corresponding to the first reduction area in the first RAID group, specifying, using the storage controller, a specific virtual storage area in which the first logical storage area is allocated from the virtual volume, selecting, using the storage controller, a second logical storage area that is not allocated to the virtual volume from among a plurality of logical storage areas in which some of the plurality of storage devices are allocated, moving, using the storage controller, data stored in the first logical storage area from the first logical storage area to the second logical storage area, allocating, using the storage controller, the second logical storage area to the specific virtual storage area, and reducing, using the storage controller, from a logical address space of each storage device among the storage devices in the first storage device group used to configure the first RAID group, a logical address range corresponding to the first reduction area which is the logical address range reduced from the logical address space in the first storage device of the first storage device group on the basis of the first failure information.

11. A storage apparatus control method according to claim 10, further comprising:

specifying, using the storage controller, failure data which is data lost by the failure in the first storage device, on the basis of the first failure information, and recovering the failure data on the basis of data stored in a storage device other than the first storage device in the first storage device group.

12. A storage apparatus control method according to claim 11, further comprising:

storing, using the storage controller, alternate area information indicating an alternate area, which is a logical address range not used by a RAID group among each logical address space of the plurality of storage devices, making it a condition that a size of the alternate area is greater than or equal to a size of the first reduction area and the alternate area is provided from the storage device in the storage device group other than the first storage device group among the plurality of storage devices, determining whether the alternate area to meet the condition is shown in the alternate area information or not, and when determining that the alternate area to meet the condition is shown in the alternate area information, using the alternate area instead of the first reduction area.

13. A storage apparatus control method according to claim 12, further comprising:

closing, using the device controller of the first storage device, a portion where the failure occurs in the first storage device.

14. A storage apparatus control method according to claim 13, further comprising:

storing, using the device controller, a user capacities, which is a size of a logical address space to be provided from the plurality of nonvolatile semiconductor memories to the storage controller and transmit the stored user capacities to the storage controller, and receiving, using the storage controller, the transmitted user capacities and store the received user capacities.

15. A storage apparatus control method according to claim 14, further comprising:

transmitting, using the storage controller, to the first storage device, an instruction for reducing a size of the first reduction area from the user capacity of the first storage device when receiving the first failure information, and reducing, using a device controller of the first storage device, according to the instruction, a size of the first reduction area from a user capacity of the first storage device.

16. A storage apparatus control method according to claim 15, further comprising:

detecting, using the storage controller, a minimum usable capacity, which is a minimum value of user capacities of storage devices in the first storage device group, and creating the first RAID group using minimum usable capacities of each storage device in the first storage device group.

17. A storage apparatus control method according to claim 12, further comprising:

creating, using the storage controller, a second RAID group using a second storage device group among the plurality of storage devices, and determining, using the storage controller, when receiving second failure information indicating a failure in a second storage device in the second storage device group from the second storage device, a second reduction area, which is a logical address range reduced from a logical address space of the second storage device, on the basis of the second failure information, specifying a related area, which is a logical address range corresponding to the second reduction area in a logical address space of a storage device other than the second storage device in the second storage device group, and registering the related area in the alternate area information as the alternate area.

18. A storage apparatus control method according to claim 12, further comprising:

registering, using the storage controller, in the alternate area information, a logical address range in an alternate storage device in the plurality of storage devices as the alternate area.

* * * * *